US011117551B2

(12) United States Patent
Okada et al.

(10) Patent No.: US 11,117,551 B2
(45) Date of Patent: Sep. 14, 2021

(54) WIPER DEVICE FOR VEHICLE

(71) Applicant: DENSO CORPORATION, Kariya (JP)

(72) Inventors: Shinichi Okada, Kariya (JP); Norihiro Sugimoto, Kariya (JP); Yohei Suzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 248 days.

(21) Appl. No.: 16/349,060

(22) PCT Filed: Dec. 26, 2017

(86) PCT No.: PCT/JP2017/046801
§ 371 (c)(1),
(2) Date: May 10, 2019

(87) PCT Pub. No.: WO2018/131477
PCT Pub. Date: Jul. 19, 2018

(65) Prior Publication Data
US 2019/0275988 A1  Sep. 12, 2019

(30) Foreign Application Priority Data

Jan. 10, 2017  (JP) .............................. JP2017-001909
May 1, 2017  (JP) .............................. JP2017-091284
Nov. 28, 2017  (JP) .............................. JP2017-228085

(51) Int. Cl.
*B60S 1/08*   (2006.01)
*B60S 1/36*   (2006.01)
(Continued)

(52) U.S. Cl.
CPC ................. *B60S 1/245* (2013.01); *B60S 1/08* (2013.01); *B60S 1/3409* (2013.01);
(Continued)

(58) Field of Classification Search
CPC ................. B60S 1/08; B60S 1/18; B60S 1/36
See application file for complete search history.

(56) References Cited

U.S. PATENT DOCUMENTS

| 6,119,301 A | 9/2000 | Nakatsukasa et al. |
| 2009/0254219 A1* | 10/2009 | Willey ...................... B60S 1/08 700/275 |
| 2016/0276899 A1* | 9/2016 | Ikeda ...................... H02K 7/14 |

FOREIGN PATENT DOCUMENTS

| DE | 4444066 A1 | 6/1996 |
| JP | H03-38448 A | 2/1991 |

(Continued)

OTHER PUBLICATIONS

Apr. 3, 2018 International Search Report issued in International Patent Application PCT/JP2017/046801.

*Primary Examiner* — Michael D Jennings
(74) *Attorney, Agent, or Firm* — Oliff PLC

(57) ABSTRACT

A first driven lever of a vehicle wiper device has a proximal end pivotally connected to a distal end of a first driving lever. A second driven lever has a proximal end pivotally connected to a distal end of the first driven lever and a distal end pivotally connected to a distal end of a second driving lever. A first wiper arm operates integrally with the second driven lever and has a distal end to which a first wiper blade is connected. A swing transmission mechanism transmits a driving force to the first driving lever. The swing transmission mechanism includes a swing crank arm integrally rotatable with a rotation shaft of a single drive source. An extension-contraction transmission mechanism transmits a driving force to the second driving lever. The extension-contraction transmission mechanism includes an extension-contraction crank arm integrally rotatable with the rotation shaft of the drive source.

14 Claims, 12 Drawing Sheets

(51) Int. Cl.
*B60S 1/24* (2006.01)
*B60S 1/34* (2006.01)
*F16H 21/40* (2006.01)
*F16H 37/12* (2006.01)

(52) U.S. Cl.
CPC .............. *B60S 1/3431* (2013.01); *B60S 1/36* (2013.01); *F16H 21/40* (2013.01); *F16H 37/12* (2013.01)

(56) References Cited

FOREIGN PATENT DOCUMENTS

| | | |
|---|---|---|
| JP | H11-227572 A | 8/1999 |
| JP | 2000-85539 A | 3/2000 |
| JP | 2015-9575 A | 1/2015 |

\* cited by examiner

WIPER DEVICE FOR VEHICLE

TECHNICAL FIELD

The present disclosure relates to a vehicle wiper device.

BACKGROUND ART

A vehicle wiper device installed on a vehicle such as an automobile may pivot a wiper arm and a wiper blade about a single point serving as the axis. In addition, a vehicle wiper device may include a four-bar link mechanism so that the wipe range of a front window (wiped surface) differs from a simple sectoral range and is set to a desired range (substantially enlarged range) (for example, patent document 1).

Such a vehicle wiper device includes a main lever pivotally supported by the vehicle body at the lower end of the front window. When the main lever is reciprocally pivoted by the driving force of a drive source, other levers including an arm head are driven and pivoted by the driving force of the main lever. Thus, the front window is wiped at a portion close to an upper corner as compared to a case in which a simple sectoral range is wiped.

PRIOR ART DOCUMENT

Patent Document

Patent Document 1: Japanese Laid-Open Patent Publication No. 11-227572

SUMMARY OF THE INVENTION

Problems that are to be Solved by the Invention

As described above, there are various vehicle wiper devices that substantially enlarge the wipe range. However, there is a further demand for a new vehicle wiper device, for example, to improve vehicle installation properties.

It is an object of the present invention to provide a vehicle wiper device capable of enlarging the wipe range in a favorable manner.

Means for Solving the Problem

To achieve the above object, one aspect of the present disclosure is a vehicle wiper device that includes a first driving lever, a second driving lever, a first driven lever, a second driven lever, a first wiper blade, a first wiper arm, a swing transmission mechanism, and an extension-contraction transmission mechanism. The first driving lever has a distal end and a proximal end. The proximal end is pivotal about a first axis located at a fixed position in relation to a vehicle body. The second driving lever has a distal end and a proximal end. The proximal end is pivotal about a second axis located at a fixed position in relation to the vehicle body. The first driven lever has a distal end and a proximal end. The proximal end is pivotally connected to the distal end of the first driving lever about a third axis. The second driven lever has a proximal end and a distal end. The proximal end is pivotally connected to the distal end of the first driven lever about a fourth axis. The distal end is pivotally connected to the distal end of the second driving lever about a fifth axis. The first wiper blade reciprocally wipes a wiped surface between upper and lower reversal positions of the wiped surface. The first wiper arm is configured to operate integrally with the second driven lever and has a distal end to which the first wiper blade is connected. The swing transmission mechanism is configured to transmit a driving force to the first driving lever. The swing transmission mechanism includes a swing crank arm integrally rotatable with a rotation shaft of a single drive source. The extension-contraction transmission mechanism is configured to transmit a driving force to the second driving lever. The extension-contraction transmission mechanism includes an extension-contraction crank arm integrally rotatable with the rotation shaft of the drive source.

Another aspect of the present disclosure is a vehicle wiper device that includes a first driving lever, a second driving lever, a first driven lever, a second driven lever, a first wiper blade, a first wiper arm, a swing transmission mechanism, an extension-contraction transmission mechanism, and a rotation speed conversion transmission member. The first driving lever has a distal end and a proximal end. The proximal end is pivotal about a first axis located at a fixed position in relation to a vehicle body. The second driving lever has a distal end and a proximal end. The proximal end is pivotal about a second axis located at a fixed position in relation to the vehicle body. The first driven lever has a distal end and a proximal end. The proximal end is pivotally connected to the distal end of the first driving lever about a third axis. The second driven lever has a proximal end and a distal end. The proximal end is pivotally connected to the distal end of the first driven lever about a fourth axis. The distal end is pivotally connected to the distal end of the second driving lever about a fifth axis. The first wiper blade reciprocally wipes a wiped surface between upper and lower reversal positions of the wiped surface. The first wiper arm is configured to operate integrally with the second driven lever and has a distal end to which the first wiper blade is connected. The swing transmission mechanism is configured to transmit a driving force to the first driving lever. The swing transmission mechanism includes a swing crank arm rotated by a driving force of a single drive source. The extension-contraction transmission mechanism is configured to transmit a driving force to the second driving lever. The extension-contraction transmission mechanism includes an extension-contraction crank arm. The rotation speed conversion transmission member connects and drives the extension-contraction crank arm and the swing crank arm so that the extension-contraction crank arm rotates at a rotation speed two times greater than a rotation speed of the swing crank arm.

EMBODIMENTS OF THE INVENTION

A first embodiment of a vehicle including a vehicle wiper device will now be described with reference to FIGS. 1 to 6.

Figure 1:
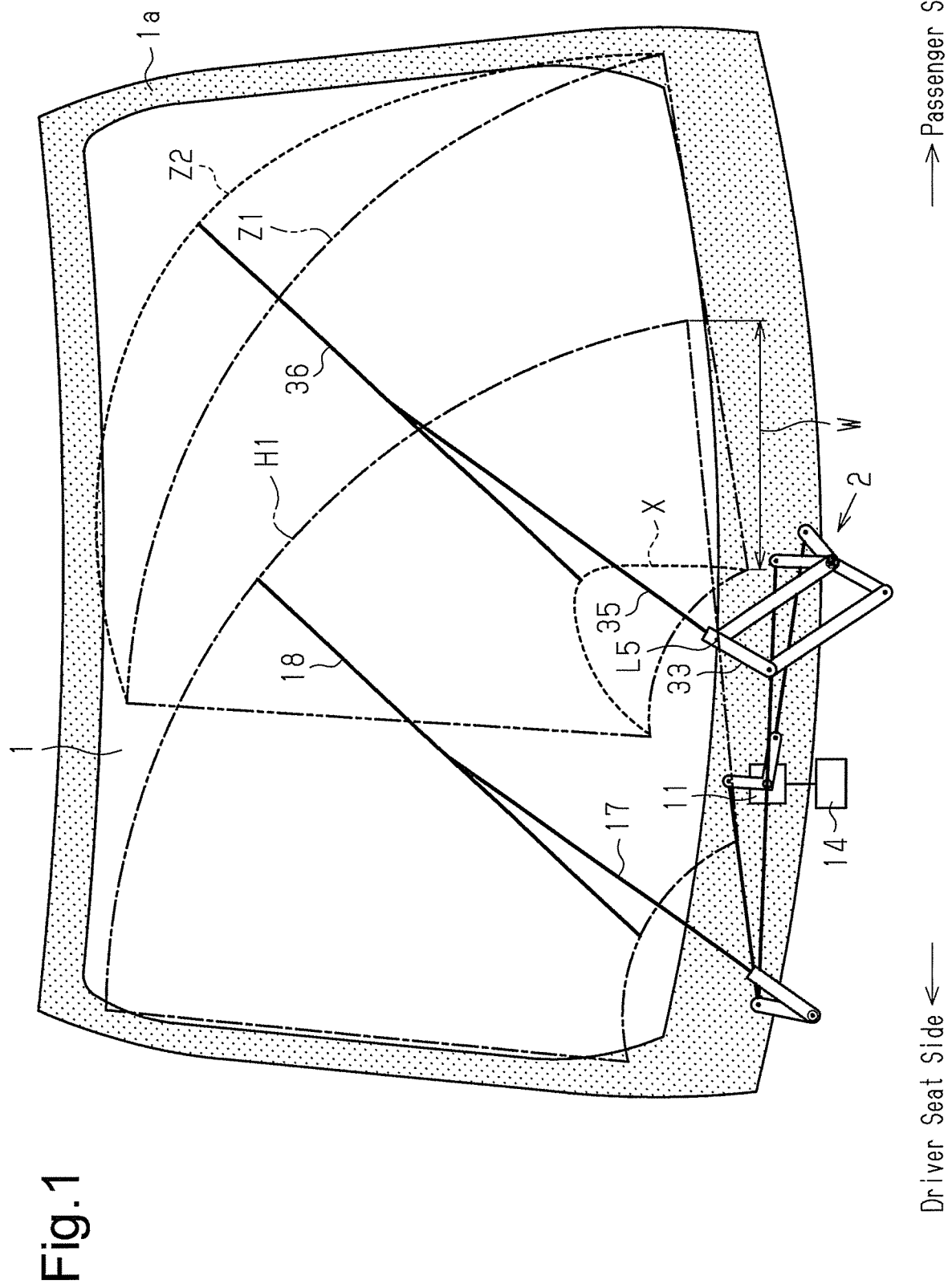
FIG. 1 is a partial schematic diagram of a vehicle including a vehicle wiper device according to a first embodiment of the present disclosure.

As shown in FIG. 1, a vehicle wiper device 2 is disposed at a lower side (ground side) of a front window 1, which corresponds to a wiped surface of a vehicle. The front window 1 has a black edge defining a black ceramic area 1a (shaded portion in FIG. 1).

Figure 2:
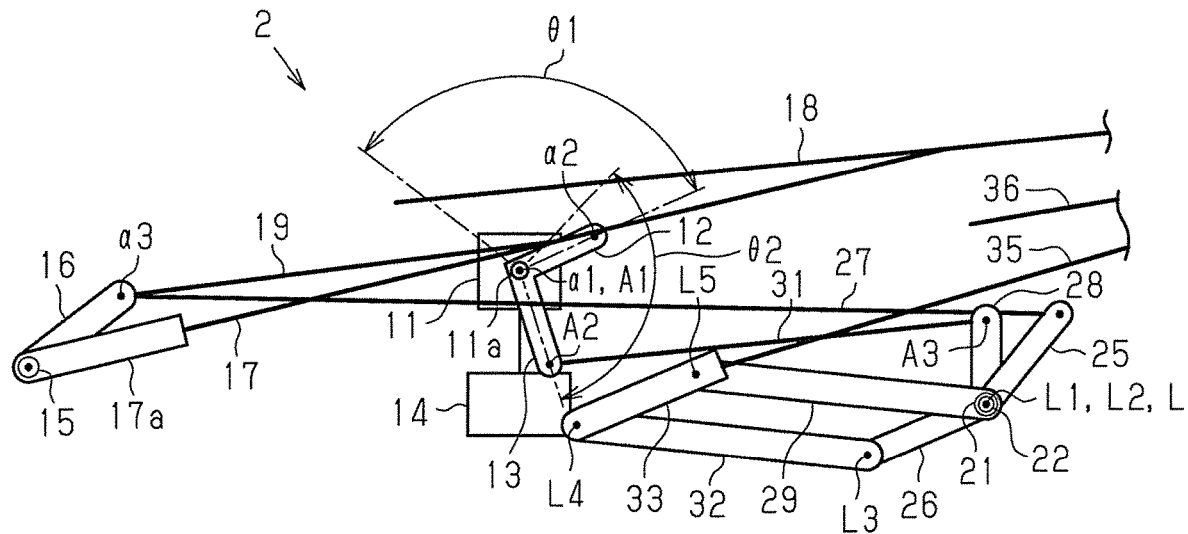
FIG. 2 is a plan view of the vehicle wiper device shown in FIG. 1.

As shown in FIG. 2, the vehicle wiper device 2 includes a motor 11 as a single drive source. The motor 11 includes a rotation shaft 11a having a distal end, to which a proximal end of a swing crank arm 12 and a proximal end of an extension-contraction crank arm 13 are integrally rotatably fixed. Preferably, the swing crank arm 12 and the extension-contraction crank arm 13 are integrally formed. The distal end of the swing crank arm 12 and the distal end of the extension-contraction crank arm 13 extend from the rotation shaft 11a in different directions.

The motor 11 is electrically connected to a control unit 14. The control unit 14 controls forward and reverse rotation (pivoting) of the motor 11 so that the rotation shaft 11a has an angular range of less than 180°. The motor 11 is, for example, a brushed DC motor or a brushless motor.

The vehicle body supports a driver seat side pivot shaft 15 pivotal at a fixed position in relation to the vehicle body. Hereinafter, "the fixed position with respect to the vehicle body" refers to a position that is invariable in relation to the vehicle body. A driver seat side swing lever 16 serves as a second wiper arm lever and is fixed to the proximal end of the driver seat side pivot shaft 15. A second wiper arm 17 (arm head 17a) is located at a driver seat side and is fixed to the distal end of the driver seat side pivot shaft 15. As shown in FIG. 1, a second wiper blade 18 is connected to the distal end of the second wiper arm 17 and wipes a region of the front window 1 at the driver seat side.

The distal end of the swing crank arm 12 and the driver seat side swing lever 16 are connected by a first connection rod 19. Thus, when the motor 11 is driven, the swing crank arm 12 pivots and transmits the power to the driver seat side swing lever 16 via the first connection rod 19 so that the driver seat side swing lever 16 swings. The second wiper arm 17 swings together with the driver seat side swing lever 16 (driven and pivoted about an axis located at a fixed position in relation to the vehicle body). Consequently, the second wiper blade 18 reciprocally wipes a range of the front window 1 between an upper reversal position and a lower reversal position at the driver seat side. The single-dashed line shown in FIG. 1 indicates a normal wipe range H1 of the second wiper blade 18.

The vehicle body also supports a passenger seat side first pivot shaft 21 pivotal about a first axis L1 and a passenger seat side second pivot shaft 22 pivotal about a second axis L2. The positions of the first axis L1 and the second axis L2 are constant in relation to the vehicle body. In the first embodiment, the passenger seat side second pivot shaft 22 is arranged such that it extends through the inside of the tubular passenger seat side first pivot shaft 21 so that the first axis L1 and the second axis L2 are disposed on the same straight line L (concentrically).

A passenger seat side first swing lever 25 is fixed to the proximal end of the passenger seat side first pivot shaft 21. A first driving lever 26 is fixed to the distal end of the passenger seat side first pivot shaft 21. The passenger seat side first swing lever 25, which pivots integrally with the first driving lever 26, and the driver seat side swing lever 16 are connected and driven by a second connection rod 27. Thus, when the motor 11 is driven and the driver seat side swing lever 16 swings as described above, the driving force is transmitted to the passenger seat side first swing lever 25 via the second connection rod 27 to swing the passenger seat side first swing lever 25. The first driving lever 26 swings (pivots) about the first axis L1 together with the passenger seat side first swing lever 25. In the first embodiment, the first connection rod 19 and the second connection rod 27 configures a swing rod that directly connects the swing crank arm 12 and the first driving lever 26.

The passenger seat side second pivot shaft 22 is formed to be longer than the passenger seat side first pivot shaft 21. The proximal end and the distal end of the passenger seat side second pivot shaft 22 project from the passenger seat side first pivot shaft 21 in the axial direction. A passenger seat side second swing lever 28 is fixed to the proximal end, and a second driving lever 29 is fixed to the distal end of the passenger seat side second pivot shaft 22.

The distal end of the extension-contraction crank arm 13 and the passenger seat side second swing lever 28 (pivoted integrally with the second driving lever 29) are connected by a third connection rod 31. Thus, when the motor 11 is driven, the extension-contraction crank arm 13 pivots and transmits the power to the passenger seat side second swing lever 28 via the third connection rod 31 so that the passenger seat side second swing lever 28 swings. The second driving lever 29 swings (pivots) together with the passenger seat side second swing lever 28. The passenger seat side first pivot shaft 21 and the passenger seat side second pivot shaft 22 are not interlocked with each other. In other words, although the passenger seat side first pivot shaft 21 and the passenger seat side second pivot shaft 22 are disposed on the same straight line L, the pivoting operations are independent from each other. In the first embodiment, the third connection rod 31 configures an extension-contraction rod that directly connects the extension-contraction crank arm 13 and the second driving lever 29.

As shown in FIGS. 2 to 6, the vehicle wiper device 2 includes a first driven lever 32 having a proximal end pivotally connected about a third axis L3 at a distal end of the first driving lever 26.

The vehicle wiper device 2 includes an arm head 33, which corresponds to a second driven lever, having a proximal end pivotally connected about a fourth axis L4 at a distal end of the first driven lever 32, and a distal end pivotally connected about a fifth axis L5 (swing center axis) at a distal end of the second driving lever 29. As shown in FIG. 1, the arm head 33 is configured to be part of a first wiper arm 35. A first wiper blade 36 for wiping a passenger seat side of the front window 1 is connected to the distal end of the first wiper arm 35.

The first driving lever 26, the second driving lever 29, the first driven lever 32, and the arm head 33 are set and connected so that the length from the first axis L1 (the second axis L2) to the third axis L3 is equal to the length from the fourth axis L4 to the fifth axis L5. Additionally, the first driving lever 26, the second driving lever 29, the first driven lever 32, and the arm head 33 are set and connected so that the length from the third axis L3 to the fourth axis L4 is equal to the length from the first axis L1 (the second axis L2) to the fifth axis L5. That is, the first driving lever 26, the second driving lever 29, the first driven lever 32, and the arm head 33 are configured to be a parallelogram link mechanism in which the first driving lever 26 and the arm head 33 maintain parallelism and the second driving lever 29 and the first driven lever 32 maintain parallelism. In the first embodiment, the first driving lever 26, the first driven lever 32, and the arm head 33 are configured to be a swing mechanism that reciprocally swings the first wiper arm 35. The second driving lever 29 is an extension-contraction mechanism that extends and contracts the first wiper arm 35 in the longitudinal direction. The second driving lever 29 is configured to be an axis-moving mechanism that moves the swing center axis (the fifth axis L5) of the proximal end of the first wiper arm 35 in the vertical direction of the front window 1. The swing crank arm 12, the first connection rod 19, the driver seat side swing lever 16, the second connection rod 27, and the passenger seat side first swing lever 25 are configured to be a swing transmission mechanism that transmits driving force to the first driving lever 26. The extension-contraction crank arm 13, the third connection rod 31, and the passenger seat side second swing lever 28 are configured to be an extension-contraction transmission mechanism that transmits driving force to the second driving lever 29.

The swing transmission mechanism is set so that the swing crank arm 12 pivots forward and reversely in a first angular range θ1. The first angular range θ1 does not include a dead center at which the rotation shaft 11a cannot be rotated when an external force is applied to the first driving lever 26. The extension-contraction transmission mechanism is set so that the extension-contraction crank arm 13 pivots forward and reversely in a second angular range θ2. The second angular range θ2 includes an intermediate point including a dead center at which the rotation shaft 11a cannot be rotated when an external force is applied to the second driving lever 29. More specifically, the swing crank arm 12 and the extension-contraction crank arm 13 are set so that the swing crank arm 12 and the first connection rod 19 (namely, joints α1 to α3) are not linearly disposed at a time of driving and the extension-contraction crank arm 13 and the third connection rod 31 (namely, joints A1 to A3) are linearly disposed at the intermediate point at the time of driving (refer to FIG. 4).

In the first embodiment, the second connection rod 27, which is part of the swing transmission mechanism, is set to move inside a portion surrounded by the first driving lever 26, the second driving lever 29, the first driven lever 32, and the arm head 33 as viewed in the axial direction of the first axis L1 in at least part of a state in which the second connection rod 27 is driven (refer to FIGS. 3 to 6). The third connection rod 31, which is part of the extension-contraction transmission mechanism, is set to move inside a portion surrounded by the first driving lever 26, the second driving lever 29, the first driven lever 32, and the arm head 33 as viewed in the axial direction of the first axis L1 in at least part of a state in which the third connection rod 31 is driven (refer to FIGS. 3 to 5).

In the above configuration, when the first driving lever 26 is pivoted so that the first wiper blade 36 performs a wiping operation, the vehicle wiper device 2 pivots the second driving lever 29 to move the fifth axis L5, which is located at the distal end of the second driving lever 29, to the upper side of the front window 1. As a result, the vehicle wiper device 2 enlarges the wiping range of the first wiper blade 36.

As shown in FIG. 1, a reference range Z1 refers to the wiping range of the first wiper blade 36 when the first wiper arm 35 simply swings (with the fifth axis L5 serving as a fixed position). As described above, when the first wiper arm 35 swings as the fifth axis L5 moves upward, the wiping range of the first wiper blade 36 is substantially enlarged and is referred to as an enlarged range Z2.

Additionally, the vehicle wiper device 2 of the first embodiment is set so that when the motor 11 is driven, the first driving lever 26 swings (pivots) within a range of the lower side of the front window 1 relative to the first axis L1, that is, the first driving lever 26 does not swing (pivot) above the first axis L1.

When the second wiper blade 18, which is located at the driver seat side, is located in the lower reversal position (rest position), the distal end of the second wiper blade 18 is located above the proximal end of the first wiper blade 36 in a direction extending along the surface of the front window 1. In other words, when located in the lower reversal position (rest position), the distal end of the second wiper blade 18 and the proximal end of the first wiper blade 36 are set to have an overlap range W vertically overlapping with each other in the direction extending along the surface of the front window 1. Additionally, the length and the overlap range W of the second wiper blade 18 are set so that the second wiper blade 18 has a wipe range H1 that includes the entire movement path X of the proximal end of the first wiper blade 36. However, a portion of the movement path X of the proximal end of the first wiper blade 36 below the lower reversal position (rest position) of the second wiper blade 18 is excluded. As a result, the wipe range (i.e., the enlarged range Z2) of the first wiper blade 36 does not include an unwiped range.

The operation of the vehicle wiper device 2 configured as described above will now be described.

When the motor 11 is driven, the second wiper arm 17 and the second wiper blade 18 simply pivot (swing) about the driver seat side pivot shaft 15 serving as the axis center. Movement of the first wiper arm 35 and the first wiper blade 36 will now be described in detail.

For example, as shown in FIG. 2, when the first wiper arm 35 (and the first wiper blade 36) is located at the rest position and the washer switch provided at the driver seat is operated, the control unit 14 drives the motor 11 to pivot the first driving lever 26 and the second driving lever 29 with the driving force. Thus, an enlarged wiping operation is performed.

Figure 3:
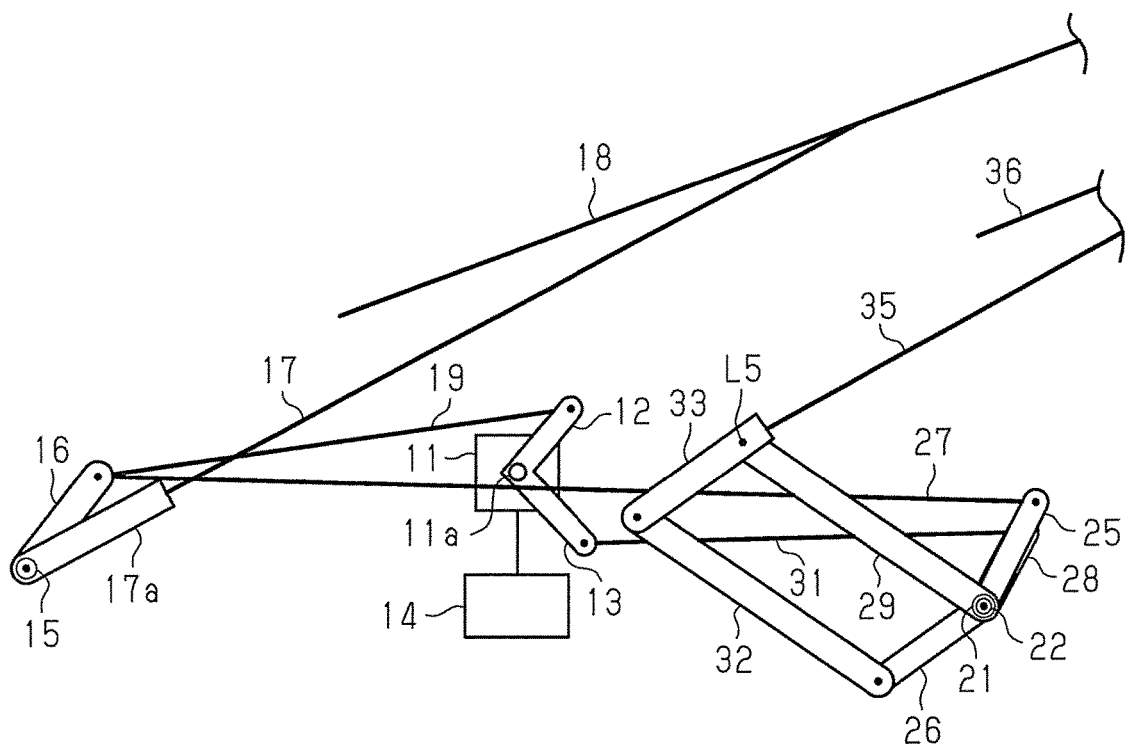
FIG. 3 is a plan view for illustrating an operation of the vehicle wiper device shown in FIG. 1.

At this time, first, as shown in FIG. 3, the first driving lever 26 is pivoted and the first wiper arm 35 (and the first wiper blade 36) is moved forward. The second driving lever 29 is also pivoted so that the fifth axis L5 is moved to the upper side of the front window 1 before the first wiper arm 35 is moved forward by about one-fourth of the distance between the upper and lower reversal positions. As a result, the distal end of the first wiper blade 36 (refer to FIG. 1) is moved upward substantially along a width-wise end portion of the front window 1 (one of opposite ends in the vehicle width-wise direction), and the front window 1 is wiped.

Figure 4:
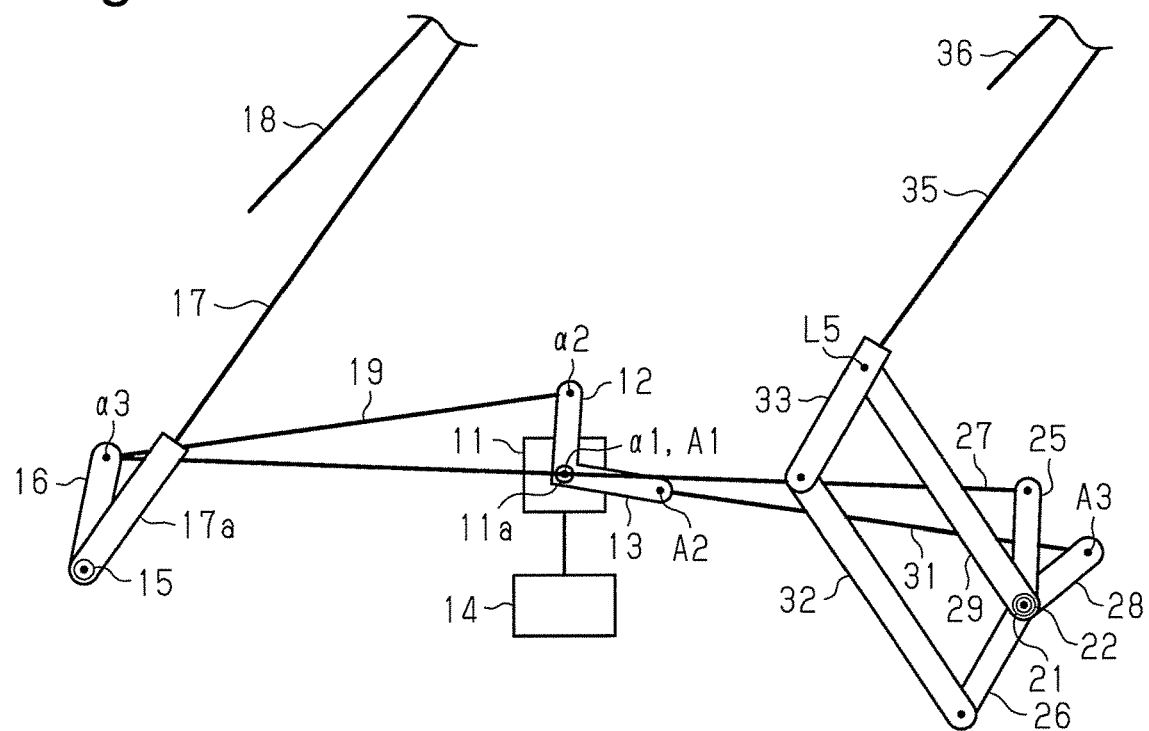
FIG. 4 is a plan view for illustrating an operation of the vehicle wiper device shown in FIG. 1

As shown in FIG. 4, the first driving lever 26 is further pivoted. Before the first wiper arm 35 (and the first wiper blade 36) is moved forward approximately one-half of the distance between the upper and lower reversal positions, the second driving lever 29 is also pivoted so that the fifth axis L5 is further moved upward. As a result, as shown in FIG. 1, the distal end of the first wiper blade 36 is moved to a position close to the upper corner of the front window 1, and the front window 1 is wiped. At this time, the extension-contraction transmission mechanism is in a dead center state in which the rotation shaft 11a cannot be rotated even when an external force is applied to the second driving lever 29. The extension-contraction crank arm 13 and the third connection rod 31 (namely, the joints A1 to A3) are linearly disposed.

Figure 5:
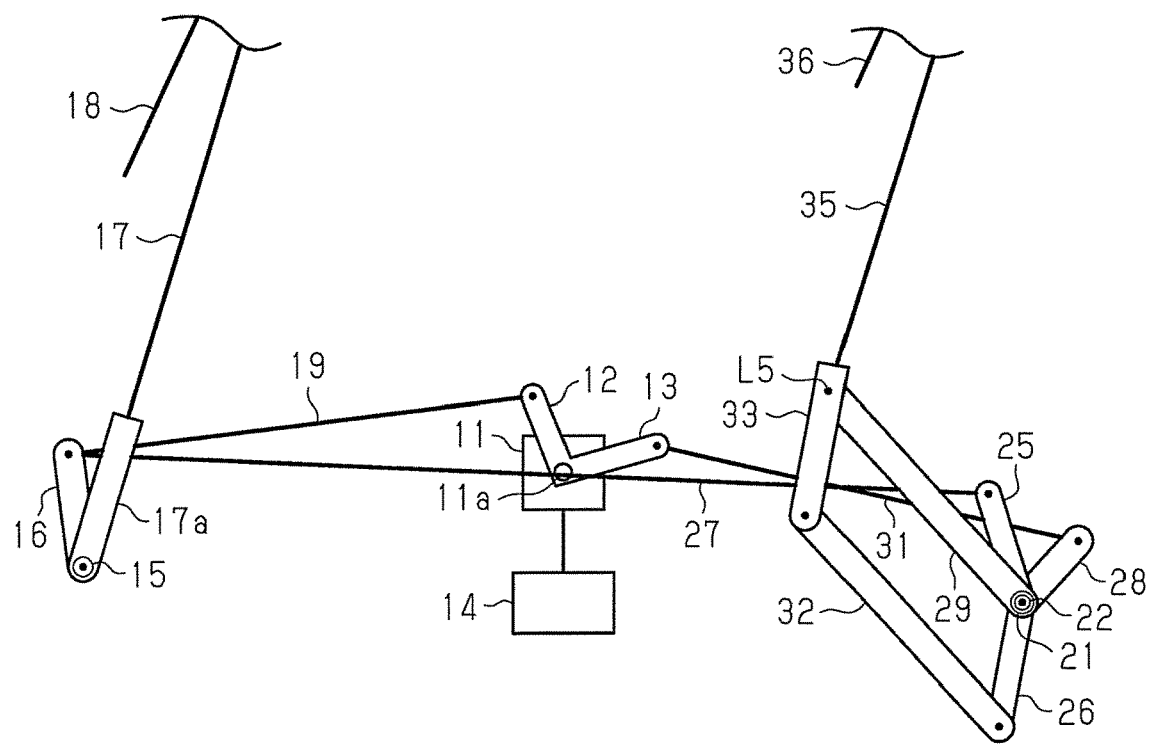
FIG. 5 is a plan view for illustrating an operation of the vehicle wiper device shown in FIG. 1.

As shown in FIG. 5, the first driving lever 26 is further pivoted. Until the first wiper arm 35 (and the first wiper blade 36) is moved forward by about three-fourths of the distance between the upper and lower reversal positions, the second driving lever 29 is also pivoted (in the reverse direction as the dead center has been passed) so that the fifth axis L5 is moved to the lower side of the front window 1. As a result, the distal end of the first wiper blade 36 (refer to FIG. 1) is moved in the width direction (the left direction in FIG. 1) substantially along the upper end of the front window 1, and the front window 1 is wiped.

Figure 6:
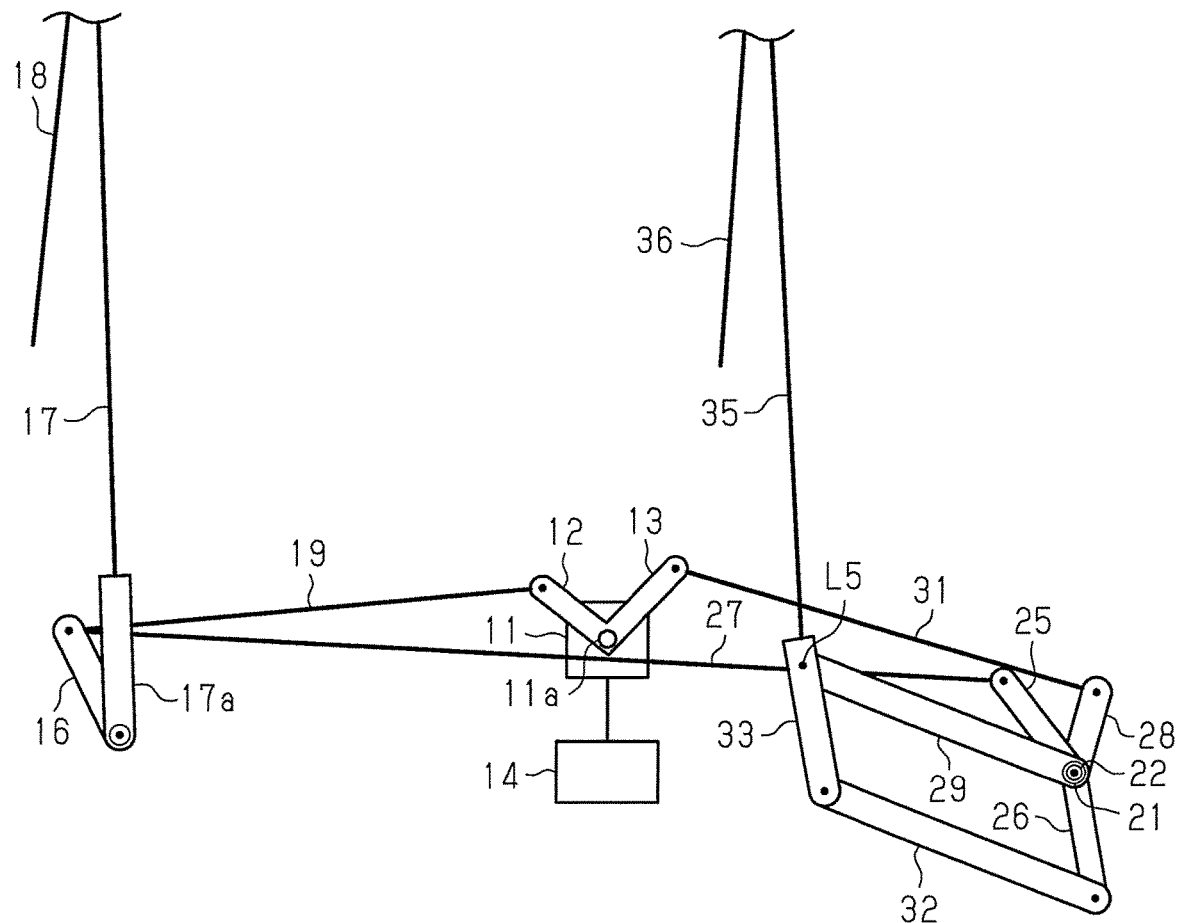
FIG. 6 is a plan view for illustrating an operation of the vehicle wiper device shown in FIG. 1.

As shown in FIG. 6, the first driving lever 26 is further pivoted. Until the first wiper arm 35 (and the first wiper blade 36) completes the forward movement, the second driving lever 29 is also pivoted (in the reverse direction) so that the fifth axis L5 is moved further downward to the reference position (same position as the rest position). As a result, the enlarged range Z2 of the front window 1 is wiped by the first wiper blade 36 (refer to FIG. 1).

When the backward movement is performed, the enlarged range Z2 is wiped by the first wiper blade 36 (refer to FIG. 1) in accordance with movement opposite to the above-described forward movement.

The advantageous effects of the first embodiment will now be described below.

(1) When the single motor 11 is driven, the driving force is transmitted to the first driving lever 26 via the swing transmission mechanism including the swing crank arm 12 and the second driving lever 29 via the extension-contraction transmission mechanism including the extension-contraction crank arm 13. The swing operation of the first wiper arm 35, that is, the wiping operation of the first wiper blade 36 is performed by the pivoting of the first driving lever 26. When the first wiper blade 36 performs the wiping operation, the pivoting of the second driving lever 29 moves the fifth axis L5 (the proximal end of the first wiper arm 35), which is located at the distal end of the second driving lever 29. This enlarges the wiping range of the first wiper blade 36.

More specifically, the swing transmission mechanism is configured so that the swing crank arm 12 is pivoted forward and reversely in the first angular range θ1. The first angular range θ1 does not include a dead center at which the rotation shaft 11a cannot be rotated even when an external force is applied to the first driving lever 26. Thus, when the rotation shaft 11a reciprocally pivots forward and reversely once, the first driving lever 26 also reciprocally swings once so that the first wiper blade 36 performs one reciprocal wiping operation. The extension-contraction transmission mechanism is configured so that the extension-contraction crank arm 13 is pivoted forward and reversely in the second angular range θ2. The second angular range θ2 has the intermediate point including a dead center at which the rotation shaft 11a cannot be rotated even when an external force is applied to the second driving lever 29. Thus, when the rotation shaft 11a reciprocally pivots forward and reversely once, the second driving lever 29 reciprocally swings twice. That is, the fifth axis L5, which is located at the distal end of the second driving lever 29, is moved to the upper side (the uppermost end) of the front window 1 at the intermediate point of the upper and lower reversal positions of the first wiper blade 36. Additionally, when the first wiper blade 36 is located in the upper and lower reversal positions, the fifth axis L5, which is located at the distal end of the second driving lever 29, is moved to the lower side (the lowest end) of the front window 1. Thus, the portion close to the upper corner of the front window 1 is wiped. More specifically, the wiping range of the first wiper blade 36 is enlarged to the enlarged range Z2.

(2) The swing transmission mechanism includes swing rods (the first connection rod 19 and the second connection rod 27) directly connecting the swing crank arm 12 and the first driving lever 26. Thus, the swing crank arm 12 and the first driving lever 26 are efficiently connected. The extension-contraction transmission mechanism includes an extension-contraction rod (third connection rod 31) directly connecting the extension-contraction crank arm 13 and the second driving lever 29. Thus, the extension-contraction crank arm 13 and the second driving lever 29 are efficiently connected. This avoids an increase in the number of components (the number of links or the number of link joints), for example, as compared with a case in which a vehicle wiper device has a connection that converts movement in a complicated manner.

(3) The swing rod includes a first connection rod 19 and a second connection rod 27. The first connection rod 19 connects the swing crank arm 12 and the driver seat side swing lever 16, which is connected to the second wiper arm 17. The second connection rod 27 connects the driver seat side swing lever 16 and the first driving lever 26 (more specifically, the passenger seat side first swing lever 25, which pivots integrally with the first driving lever 26). Although two swing rods are used, the swing rods are also used to drive the second wiper arm 17 and thus efficiently used.

(4) The second connection rod 27, which is part of the swing transmission mechanism, is set so as to move inside a portion surrounded by the first driving lever 26, the second driving lever 29, the first driven lever 32, and the arm head 33 as viewed in the axial direction of the first axis L1 in at least part of a state in which the second connection rod 27 is driven. Thus, the installation space is decreased as compared with a case in which second connection rod 27 does not move inside the portion.

(5) The third connection rod 31, which is part of the extension-contraction transmission mechanism, is set so as to move inside a portion surrounded by the first driving lever 26, the second driving lever 29, the first driven lever 32, and the arm head 33 as viewed in the axial direction of the first axis L1 in at least part of a state in which the third connection rod 31 is driven. Thus, the installation space is decreased as compared with a case in which the third connection rod 31 does not move inside the portion.

The first embodiment may be modified as follows.

In the first embodiment, the swing crank arm 12, which is rotated integrally with the rotation shaft 11a of the motor 11, and the driver seat side swing lever 16, which is rotated integrally with the second wiper arm 17, are connected by the first connection rod 19. The proximal end of the second wiper arm 17 may be integrally rotatably connected to the rotation shaft 11a.

Figure 7:
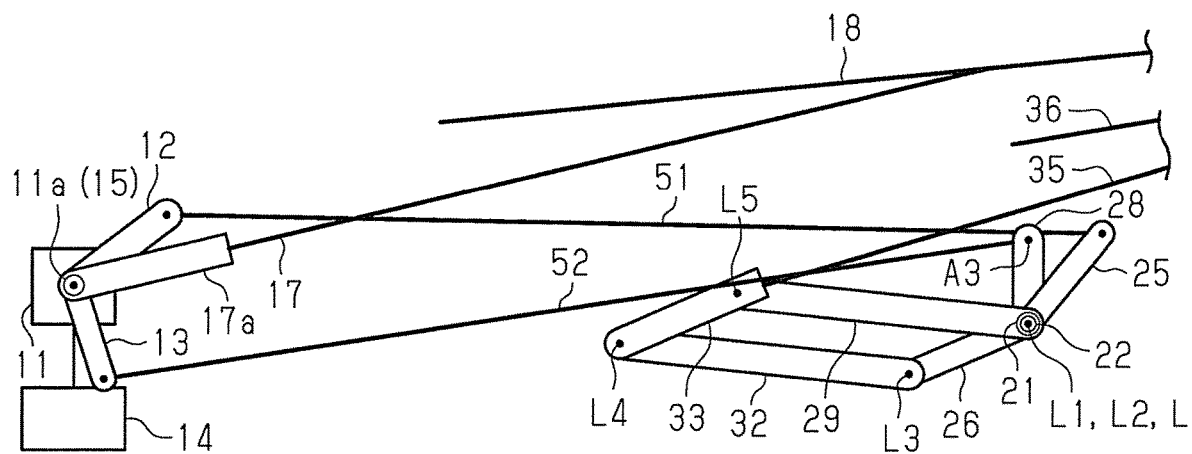
FIG. 7 is a plan view of a vehicle wiper device in a further example of the first embodiment.

More specifically, as shown in FIG. 7, the motor 11 may be disposed in the vicinity of the proximal end of the second wiper arm 17, and the rotation shaft 11a may be used as the driver seat side pivot shaft 15 of the first embodiment. In this case, the proximal end of the swing crank arm 12 is fixed to the rotation shaft 11a so as to rotate integrally with the rotation shaft 11a. The proximal end of the extension-contraction crank arm 13 is fixed to the rotation shaft 11a so as to rotate integrally with the rotation shaft 11a. The swing crank arm 12 and the passenger seat side first swing lever 25 may be connected and driven by a connection rod 51 (swing rod), and the extension-contraction crank arm 13 and the passenger seat side second swing lever 28 may be connected and driven by a connection rod 52 (extension-contraction rod). In this example, the swing crank arm 12, the connection rod 51, and the passenger seat side first swing lever 25 are configured to be a swing transmission mechanism that transmits a driving force to the first driving lever 26. In this example, the extension-contraction crank arm 13, the connection rod 52, and the passenger seat side second swing lever 28 are configured to be an extension-contraction transmission mechanism that transmits a driving force to the second driving lever 29.

This connects the proximal end of the second wiper arm 17 to the rotation shaft 11a of the motor 11 so as to rotate integrally with the rotation shaft 11a. Thus, the second wiper arm 17 is driven while reducing levers and rods as compared with the first embodiment.

In the first embodiment, the single motor 11 is configured to drive the second wiper arm 17 in addition to the first wiper arm 35. However, there is no limit to such a configuration. For example, the second wiper arm 17 may be driven by a separate motor. In this case, the first connection rod 19 and the second connection rod 27 may be changed to a single swing rod that connects the swing crank arm 12 and the first driving lever 26 (more specifically, the passenger seat side first swing lever 25, which pivots integrally with the first driving lever 26). The configuration may be operated in the same manner as the first embodiment by connecting the swing crank arm 12 and the driver seat side swing lever with the first connection rod 19 (not configured to be a swing transmission mechanism) while connecting the swing crank arm 12 and the first driving lever 26 (more specifically, the passenger seat side first swing lever 25, which pivots integrally with the first driving lever 26) with a single swing rod.

In the first embodiment, the second connection rod 27 is set so as to move inside a portion surrounded by the first driving lever 26, the second driving lever 29, the first driven lever 32, and the arm head 33. However, there is no limit to such a configuration. The second connection rod 27 may be set so as not to move inside the portion.

In the first embodiment, the third connection rod 31 is set so as to move inside a portion surrounded by the first driving lever 26, the second driving lever 29, the first driven lever 32, and the arm head 33. However, there is no limit to such a configuration. The third connection rod 31 may be set so as not to move inside the portion.

In the first embodiment, the first axis L1 of the first driving lever 26 and the second axis L2 of the second driving lever 29 are disposed on the same straight line L. However, there is no limit to such a configuration. For example, the first axis L1 of the first driving lever and the second axis L2 of the second driving lever may be disposed at positions separated from each other.

In the first embodiment, the first driving lever 26 pivots within a range below the first axis L1. The first driving lever 26 may pivot in a range above the first axis L1.

In the first embodiment, the length from the first axis L1 to the third axis L3 is set to be the same as the length from the fourth axis L4 to the fifth axis L5. The length from the third axis L3 to the fourth axis L4 is set to be the same as the length from the first axis L1 to the fifth axis L5. These lengths may be changed to differ from each other.

In the first embodiment, the proximal end of the first wiper arm 35 is disposed at a position toward the center in the vehicle width direction, and the proximal end of the second wiper arm 17 is disposed at a position toward the driver seat side end in the vehicle width direction. However, there is no limit to such a configuration. The positions of the proximal end of the first wiper arm 35 and the proximal end of the second wiper arm 17 may be reversed.

Figure 8:
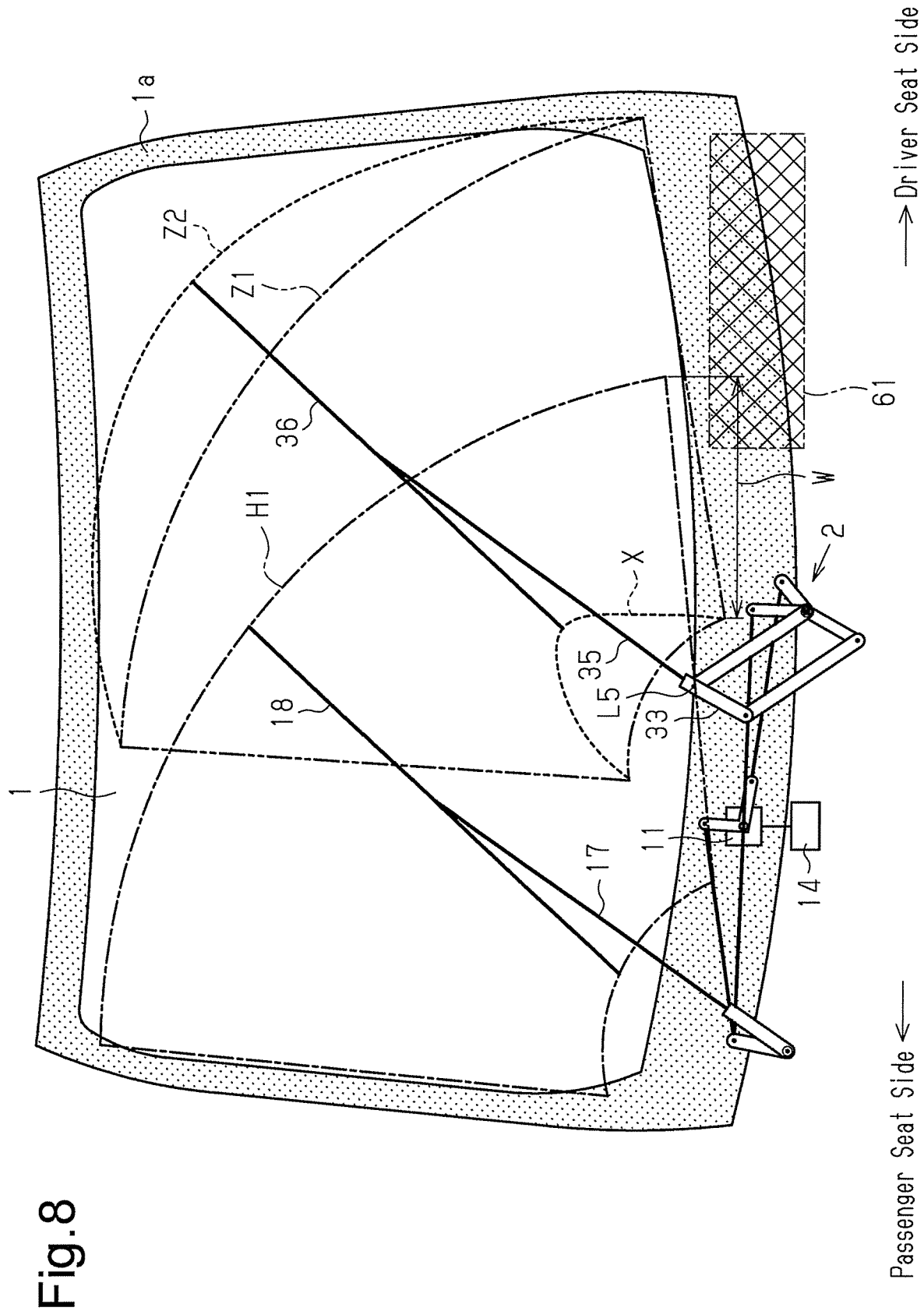
FIG. 8 is a partial schematic diagram of a vehicle including the vehicle wiper device according to the further example of the first embodiment.

More specifically, as shown in FIG. 8, the proximal end of the first wiper arm 35 may be disposed at a position toward the center in the vehicle width direction, and the proximal end of the second wiper arm 17 may be disposed at a position toward the passenger seat side in the vehicle width direction (the left side in FIG. 8). The position toward the center in the vehicle width direction is a position closer to the center in the vehicle width direction than the opposite ends in the vehicle width direction. The position toward the passenger seat side end in the vehicle width direction is a position closer to the passenger seat side end in the vehicle width direction than the center. In the vehicle of this example (refer to FIG. 8), the driver seat is disposed at a side (the right side in FIG. 8) opposite to that of the first embodiment.

This ensures a wide space 61 (mesh portion in FIG. 8) at the driver seat side. Thus, for example, a heads-up display device that displays a traveling condition and the like on the front window is easily arranged in the space 61 at the driver seat side.

A second embodiment of a vehicle including a vehicle wiper device will now be described with reference to FIGS. 9 to 15.

Figure 9:
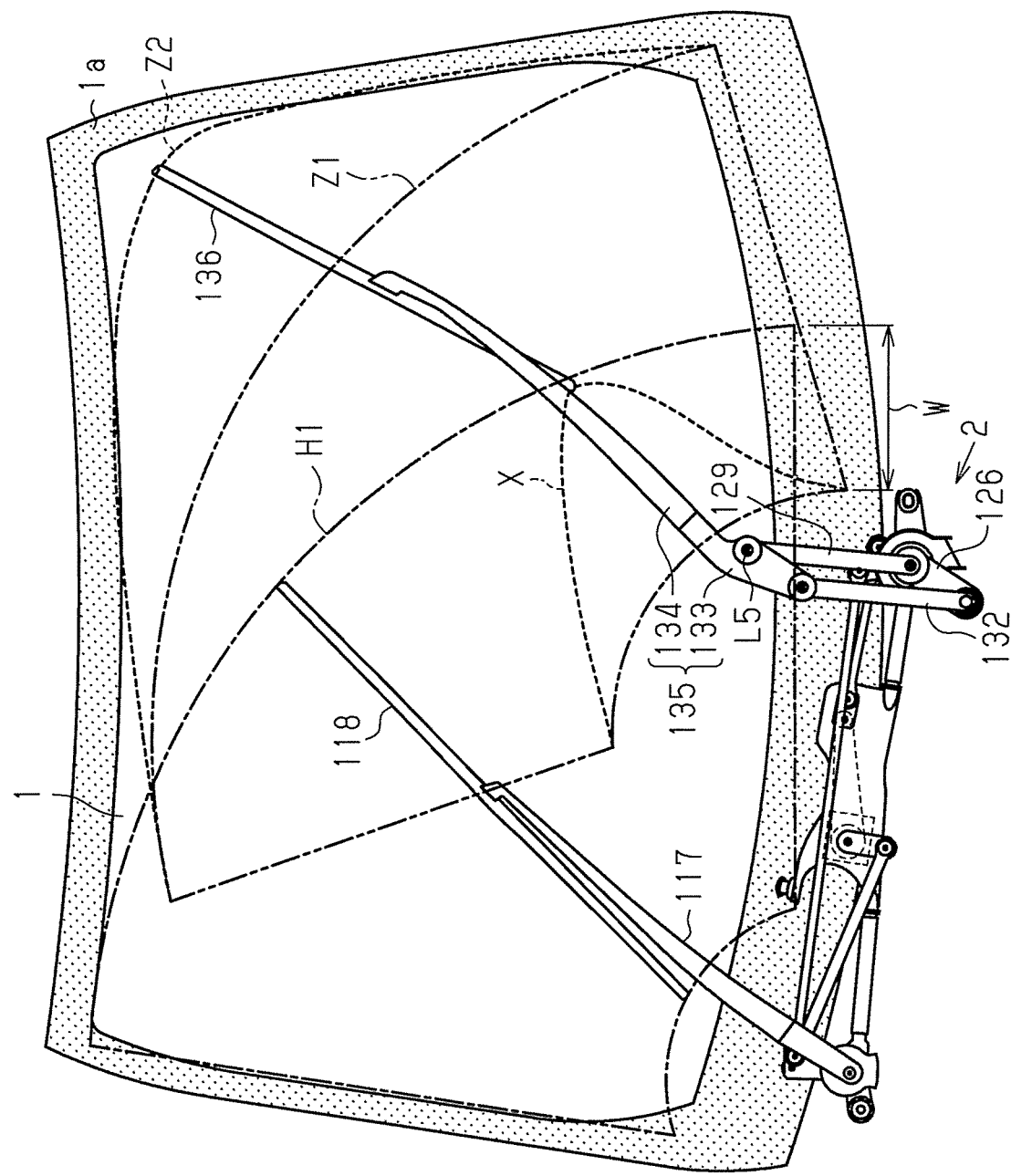
FIG. 9 is a partial schematic diagram of a vehicle including a vehicle wiper device according to a second embodiment of the present disclosure.

As shown in FIG. 9, a vehicle wiper device 2 is disposed at a lower side (ground side) of the front window 1, which corresponds to a wiped surface of a vehicle. The front window 1 has a black edge defining a black ceramic area 1a (shaded portion in FIG. 9).

As shown in FIGS. 10 and 12 to 14, the vehicle wiper device 2 includes a plate-shaped central frame 3, two pipe frames 4 and 5, each of which has one end fixed to the central frame 3 and extends from the central frame 3 to opposite sides in the vehicle width direction, and first and second holder members 6 and 7 fixed to the other ends of the pipe frames 4 and 5. The central frame 3 includes a support portion 3a supported by the vehicle. The first and second holder members 6 and 7 respectively include fixing portions 6a and 7a fastened to the vehicle. This fixes the vehicle wiper device 2 to the vehicle (vehicle body).

Figure 15:
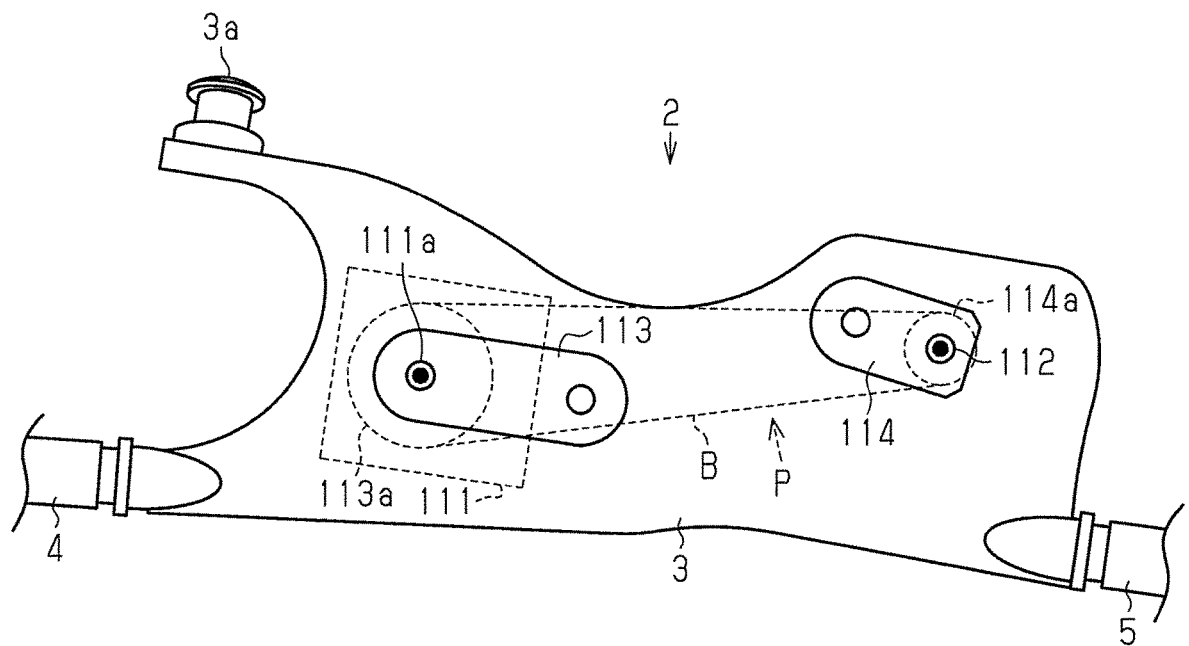
FIG. 15 is a partial enlarged plan view of the vehicle wiper device shown in FIG. 9.

As shown in FIG. 15, the vehicle wiper device 2 includes a motor 111 as a drive source fixed to a rear surface (the surface toward the inner side of the vehicle) of the central frame 3.

The motor 111 includes a rotation shaft 111a extending through the central frame 3 and projecting from the surface (the surface toward the outer side of the vehicle) of the central frame 3 at a driver seat side (the left side in FIG. 15)

position of the central frame 3. The rotation shaft 111a has a distal end, to which a proximal end of a swing crank arm 113 is fixed.

A driven rotation shaft 112 extends through the central frame 3 and is rotatably supported by the central frame 3 at a passenger seat side (the right side in FIG. 15) position. The driven rotation shaft 112 has a distal end projecting from the surface (the surface toward the outer side of the vehicle) of the central frame 3. A proximal end of an extension-contraction crank arm 114 is fixed to the distal end of the driven rotation shaft 112.

The swing crank arm 113 and the extension-contraction crank arm 114 are connected and driven by a rotation speed conversion transmission member P so that the extension-contraction crank arm 114 rotates at a rotation speed two times greater than the rotation speed of the swing crank arm 113.

More specifically, a swing-side rotation body 113a, which rotates integrally with the swing crank arm 113, is fixed to the proximal end (a portion toward the rear surface of the central frame 3) of the rotation shaft 111a. An extension-contraction-side rotation body 114a, which rotates integrally with the extension-contraction crank arm 114, is fixed to the proximal end (a portion toward the rear surface of the central frame 3) of the driven rotation shaft 112. The swing-side rotation body 113a and the extension-contraction-side rotation body 114a are connected and driven by a belt B. The belt B is a looped wire member running over the swing-side rotation body 113a and the extension-contraction-side rotation body 114a and serves as an intermediate transmission member. Thus, the extension-contraction-side rotation body 114a (the extension-contraction crank arm 114) rotates at a rotation speed two times greater than the rotation speed of the swing-side rotation body 113a (swing crank arm 113). In the second embodiment, the outer circumference of the swing-side rotation body 113a and the extension-contraction-side rotation body 114a have teeth. The number of teeth of the swing-side rotation body 113a is set to be two times greater than the number of teeth of the extension-contraction-side rotation body 114a. The belt B is formed from a flexible material (rubber, resin, etc.) and includes projections arranged on an inner side of the looped portion to engage with the teeth of the swing-side rotation body 113a and the extension-contraction-side rotation body 114a. The rotation speed conversion transmission member P is configured by the swing-side rotation body 113a, the extension-contraction-side rotation body 114a, and the belt B.

Figure 10:
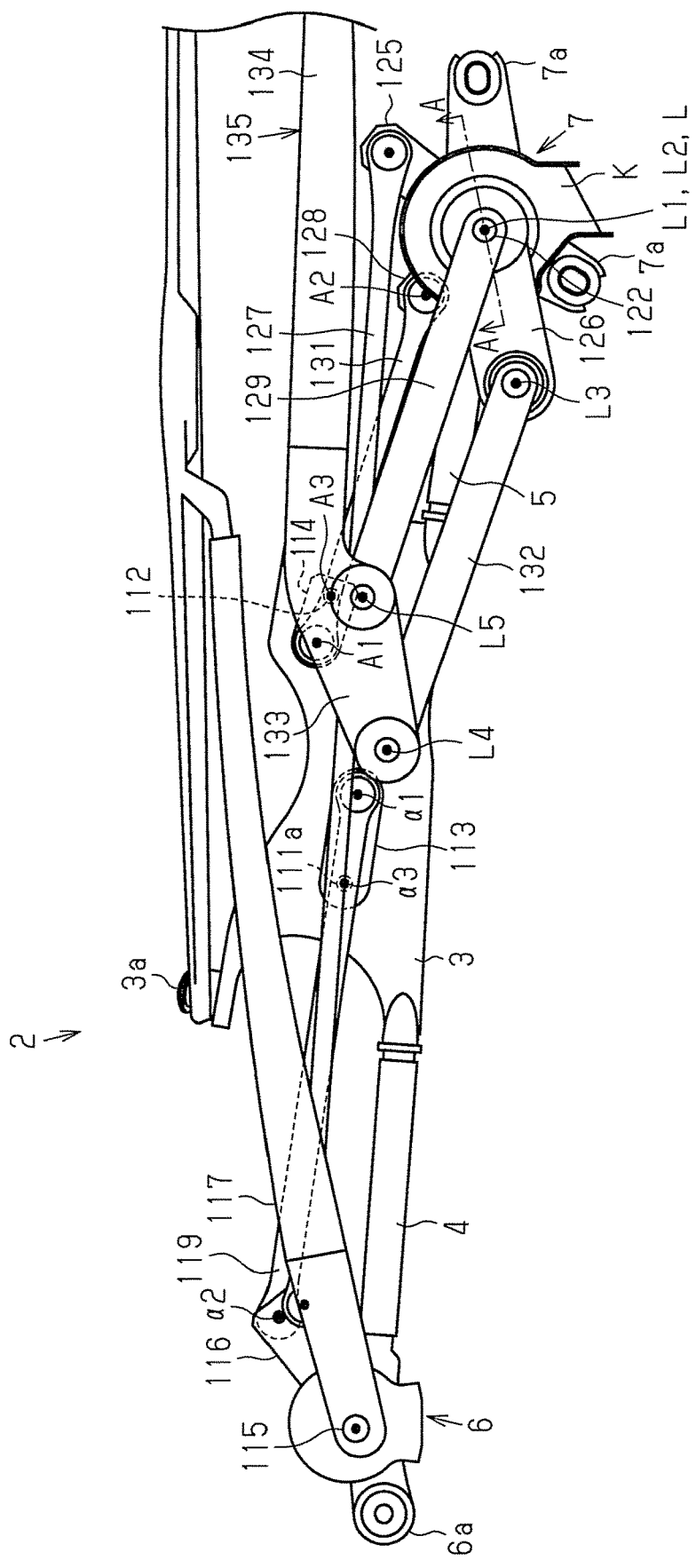
FIG. 10 is a plan view of the vehicle wiper device shown in FIG. 9.

As shown in FIG. 10, the first holder member 6 rotatably supports a driver seat side pivot shaft 115. The driver seat side pivot shaft 115 has a proximal end (the end located behind the plane of FIG. 10), to which a driver seat side swing lever 116 is fixed. The driver seat side pivot shaft 115 has a distal end (the end located frontward on the plane of FIG. 10), to which a second wiper arm 117 (arm head) located at the driver seat side is fixed. As shown in FIG. 9, the second wiper arm 117 has a distal end, to which a second wiper blade 118 that wipes the driver seat side of the front window 1 is connected.

The distal end of the swing crank arm 113 and the driver seat side swing lever 116 are connected by a first connection rod 119. Thus, when the motor 111 is driven, the swing crank arm 113 rotates and transmits the power to the driver seat side swing lever 116 via the first connection rod 119 so that the driver seat side swing lever 116 swings. The second wiper arm 117 swings (is pivotally driven about a fixed axis in relative to the vehicle) together with the driver seat side swing lever 116. The second wiper blade 118 reciprocally wipes the driver seat side of the front window 1 in the range between the upper reversal position and the lower reversal position. The single-dashed line shown in FIG. 9 indicates the wipe range H1 of the second wiper blade 118.

Figure 11:
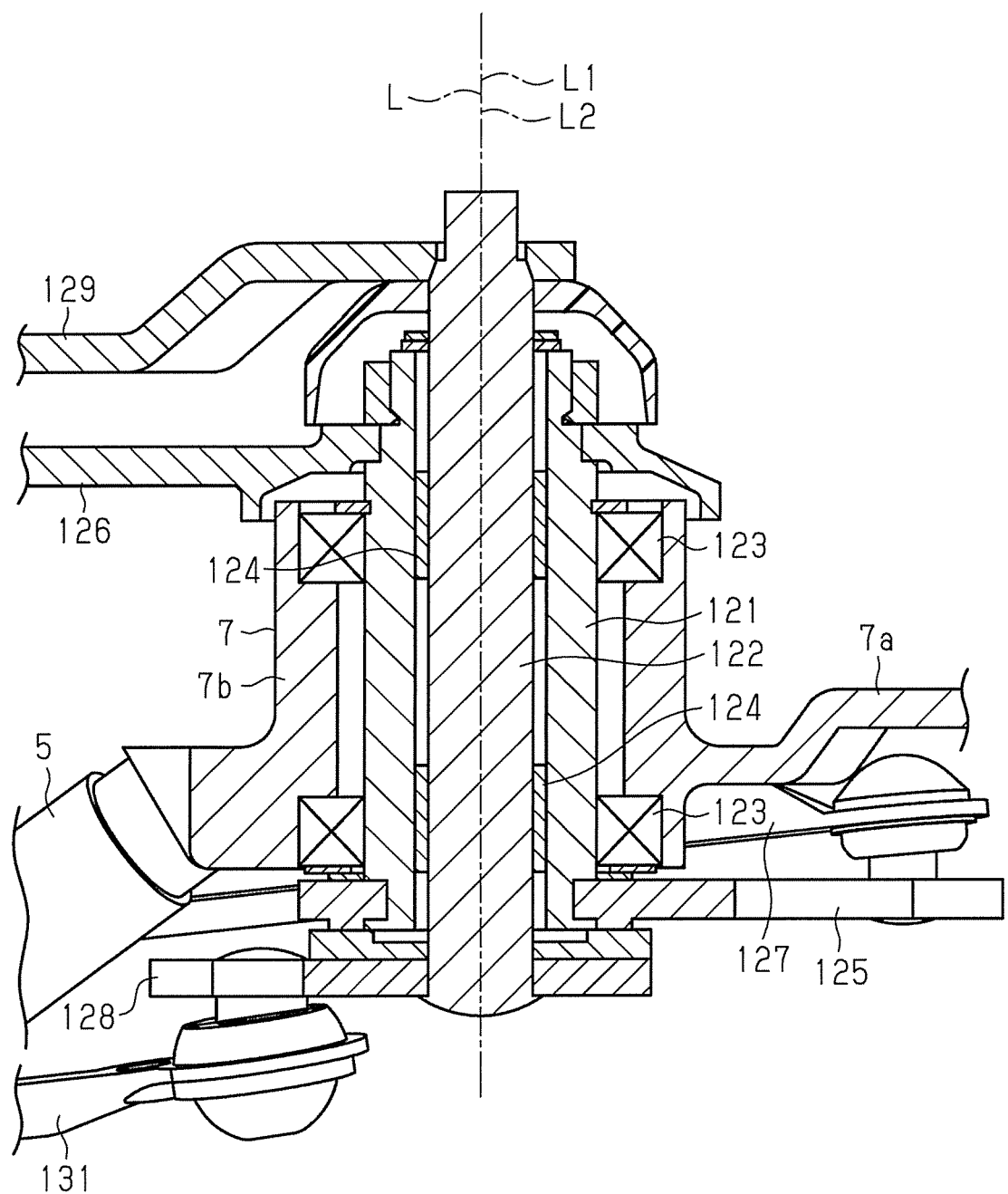
FIG. 11 is a cross-sectional view taken along line A-A in FIG. 10.

As shown in FIG. 11, the second holder member 7 pivotally supports a passenger seat side first pivot shaft 121 about a first axis L1 and a passenger seat side second pivot shaft 122 about a second axis L2. The first axis L1 and the second axis L2 are disposed on the same straight line L (concentrically).

More specifically, the second holder member 7 includes a tubular portion 7b, and the passenger seat side first pivot shaft 121 is pivotally supported by an inner side of the tubular portion 7b via bearings 123. The passenger seat side first pivot shaft 121 is tubular, and the passenger seat side second pivot shaft 122 is pivotally supported by an inner circumferential side of the passenger seat side first pivot shaft 121 via bearings 124. Thus, the first axis L1 of the passenger seat side first pivot shaft 121 and the second axis L2 of the passenger seat side second pivot shaft 122 are located at a fixed position (immovable position) in relation to the vehicle body and are disposed on the same straight line L.

A passenger seat side first swing lever 125 is fixed to the proximal end of the passenger seat side first pivot shaft 121, and a first driving lever 126 is fixed to the distal end of the passenger seat side first pivot shaft 121. As shown in FIG. 10, the passenger seat side first swing lever 125 and the driver seat side swing lever 116 are connected and driven by a second connection rod 127. Thus, as described above, when the motor 111 is driven and the driver seat side swing lever 116 swings, the driving force is transmitted to the passenger seat side first swing lever 125 via the second connection rod 127 and swings the passenger seat side first swing lever 125. The first driving lever 126 swings (pivots) about the first axis L1 together with the passenger seat side first swing lever 125.

As shown in FIG. 11, the passenger seat side second pivot shaft 122 is longer than the passenger seat side first pivot shaft 121, and the proximal end and the distal end of the passenger seat side second pivot shaft 122 project from the passenger seat side first pivot shaft 121 in the axial direction. A passenger seat side second swing lever 128 is fixed to the proximal end, and a second driving lever 129 is fixed to the distal end of the passenger seat side second pivot shaft 122.

The distal end of the extension-contraction crank arm 114 and the passenger seat side second swing lever 128 are connected by a third connection rod 131. Thus, when the motor 111 is driven, the extension-contraction crank arm 114 rotates (at a rotation speed two times greater than the rotation speed of the swing crank arm 113) and the power is transmitted via the third connection rod 131 to the passenger seat side second swing lever 128. The passenger seat side second swing lever 128 swings, and the second driving lever 129 swings (pivots) together with the passenger seat side second swing lever 128. The passenger seat side first pivot shaft 121 and the passenger seat side second pivot shaft 122 are not interlocked with each other. In other words, although the passenger seat side first pivot shaft 121 and the passenger seat side second pivot shaft 122 are disposed on the same straight line L, the rotation operations are independent from each other. In FIGS. 10 and 12 to 14, a water protection cover K is shown on the second holder member 7, but the water protection cover K is not shown in FIG. 11.

As shown in FIGS. 10 and 12 to 14, the vehicle wiper device 2 includes a first driven lever 132 having a proximal end connected to the first driving lever 126 and pivotal about a third axis L3 at a distal end of the first driving lever 126.

The vehicle wiper device 2 further includes an arm head 133 serving as a second driven lever. The arm head 133 has a proximal end pivotally connected about a fourth axis L4, which is located at a distal end of the first driven lever 132, and a distal end pivotally connected about a fifth axis L5 (swing center axis), which is located at the distal end of the second driving lever 129. As shown in FIG. 9, the arm head 133 is configured to be a first wiper arm 135 together with, for example, a retainer 134 connected to the distal end of the arm head 133, and an arm piece, which is not shown in the drawings. A first wiper blade 136 that wipes a passenger seat side region of the front window 1 is connected to the distal end of the first wiper arm 135.

The first driving lever 126, the second driving lever 129, the first driven lever 132, and the arm head 133 are set and connected so that the length from the first axis L1 (the second axis L2) to the third axis L3 is the same as the length from the fourth axis L4 to the fifth axis L5. The first driving lever 126, the second driving lever 129, the first driven lever 132, and the arm head 133 are set and connected so that the length from the third axis L3 to the fourth axis L4 is the same as the length of the first axis L1 (the second axis L2) to the fifth axis L5. That is, the first driving lever 126, the second driving lever 129, the first driven lever 132, and the arm head 133 are configured to be a parallelogram link mechanism in which the first driving lever 126 and the arm head 133 maintain parallelism and the second driving lever 129 and the first driven lever 132 maintain parallelism. In the second embodiment, the first driving lever 126, the first driven lever 132, and the arm head 133 are configured to be a swing mechanism that reciprocally swings the first wiper arm 135. The second driving lever 129 is configured to be an extension-contraction mechanism that extends and contracts the first wiper arm 135 in the longitudinal direction and an axis-moving mechanism that moves the swing center axis (fifth axis L5) of the first wiper arm 135 in the vertical direction of the front window 1. The swing crank arm 113, the first connection rod 119, the driver seat side swing lever 116, the second connection rod 127, and the passenger seat side first swing lever 125 are configured to be a swing transmission mechanism that transmits a driving force to the first driving lever 126. The extension-contraction crank arm 114, the third connection rod 131, and the passenger seat side second swing lever 128 are configured to be an extension-contraction transmission mechanism that transmits a driving force to the second driving lever 129.

The swing transmission mechanism is set so that when the swing crank arm 113 rotates once, the first driving lever 126 reciprocally swings once. The extension-contraction transmission mechanism is set so that when the extension-contraction crank arm 114 rotates once, the second driving lever 129 reciprocally swings once. More specifically, when the rotation shaft 111a of the motor 111 is driven to rotate once, the swing transmission mechanism is set so that the swing crank arm 113 rotates once and the first driving lever 126 reciprocally swings once, and the extension-contraction transmission mechanism is set so that the extension-contraction crank arm 114 rotates twice and the second driving lever 129 reciprocally swings twice.

In the above configuration, when the first driving lever 126 is pivoted so that the first wiper blade 136 performs a wiping operation, the vehicle wiper device 2 pivots the second driving lever 129 to move the fifth axis L5, which is located at the distal end of the second driving lever 129, to the upper side of the front window 1. As a result, the vehicle wiper device 2 enlarges (varies) the wiping range of the first wiper blade 136.

As shown in FIG. 9, a reference range Z1 refers to the wiping range of the first wiper blade 136 when the first wiper arm 135 simply swings (with the fifth axis L5 serving as a fixed position). As described above, when the first wiper arm 135 swings as the fifth axis L5 moves upward, the wiping range of the first wiper blade 136 is substantially enlarged and is referred to as an enlarged range Z2.

Additionally, the vehicle wiper device 2 of the second embodiment is set so that when the motor 111 is driven, the first driving lever 126 swings (pivots) within a range of the lower side of the front window 1 relative to the first axis L1. In other words, the first driving lever 126 does not swing (pivot) above the first axis L1.

When the second wiper blade 118, which is located at the driver seat side, is located in the lower reversal position (rest position), the distal end of the second wiper blade 118 is located above the proximal end of the first wiper blade 136 in a direction extending along the surface of the front window 1. In other words, when located in the lower reversal position (rest position), the distal end of the second wiper blade 118 and the proximal end of the first wiper blade 136 are set to have an overlap range W vertically overlapping with each other in the direction extending along the surface of the front window 1. Additionally, the length and the overlap range W of the second wiper blade 118 are set so that the second wiper blade 118 has a wipe range H1 that includes the entire movement path X of the proximal end of the first wiper blade 136. However, a portion of the movement path X of the proximal end of the first wiper blade 36 below the lower reversal position (rest position) of the second wiper blade 118 is excluded. As a result, the wipe range (i.e., the enlarged range Z2) of the first wiper blade 136 does not include an unwiped range.

As shown in FIG. 10, when the second wiper blade 118 is in the lower reversal position (rest position), the swing crank arm 113 and the first connection rod 119 (namely, the joints α1 to α3) are linearly disposed, and the extension-contraction crank arm 114 and the third connection rod 131 (namely, the joints A1 to A3) are linearly disposed.

The operation of the vehicle wiper device 2 configured as described above will now be described.

When the first motor 111 is driven, the second wiper arm 117 and the second wiper blade 118 simply pivot (swing) about the driver seat side pivot shaft 115 serving as the axis center. The movement of the first wiper arm 135 and the first wiper blade 136 will now be described in detail.

For example, as shown in FIG. 10, when the first wiper arm 135 (and the first wiper blade 136) is located at the rest position and the washer switch provided at the driver seat is operated, the motor 111 is driven. The swing crank arm 113 and the extension-contraction crank arm 114 rotate, and the first driving lever 126 and the second driving lever 129 pivot. Thus, an enlarged wiping operation is performed.

Figure 12:
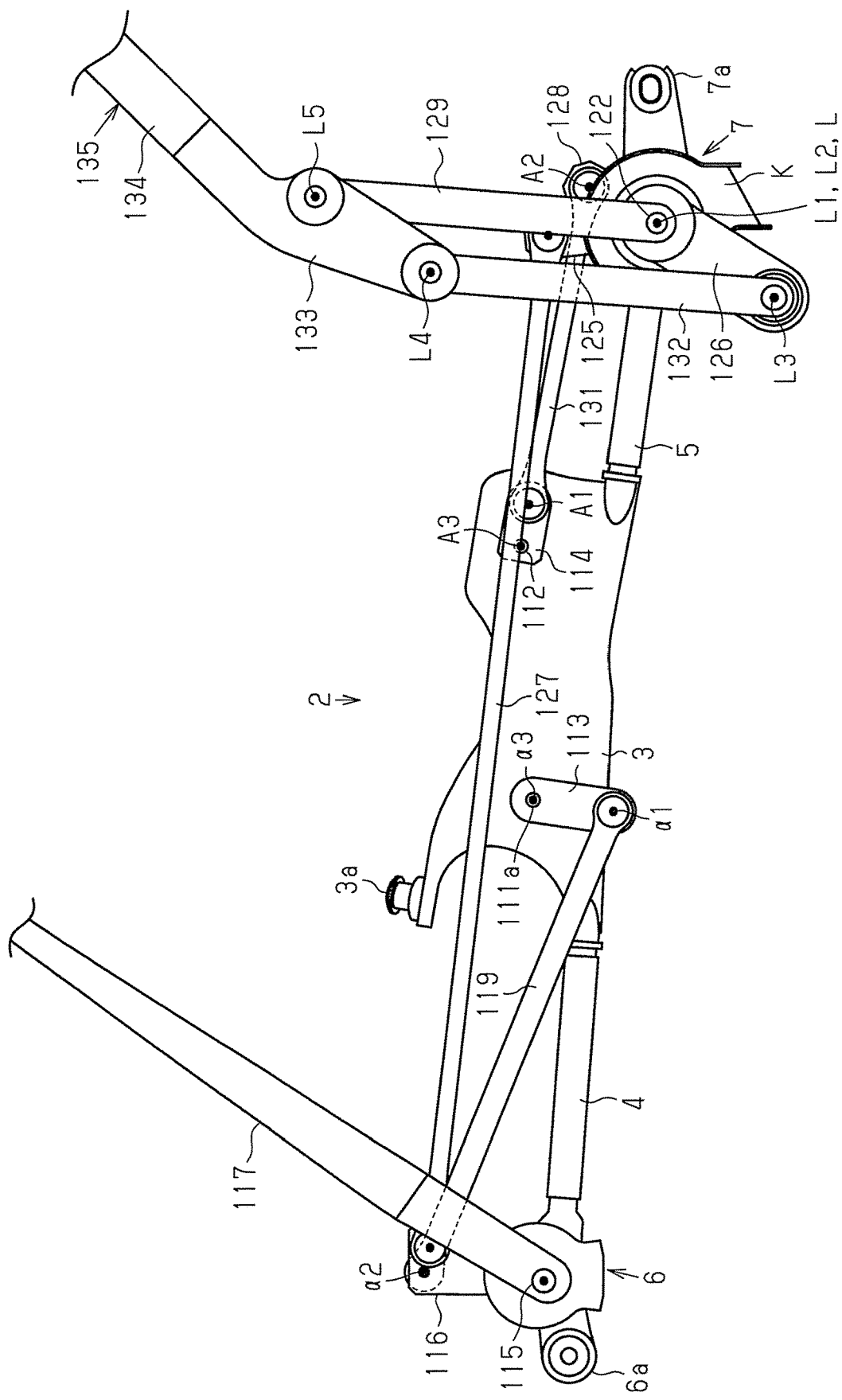
FIG. 12 is a plan view for illustrating an operation of the vehicle wiper device shown in FIG. 9.

At this time, as shown in FIG. 12, when the swing crank arm 113 is rotated by 90°, the first driving lever 126 is pivoted, and the first wiper arm 135 (and the first wiper blade 136) moves forward approximately one-half of the distance between the upper and lower reversal positions. By this time, the extension-contraction crank arm 114 is rotated by 180°, and the second driving lever 129 is also pivoted so that the fifth axis L5 moves upward. As a result, as shown in FIG. 9, the distal end of the first wiper blade 136 is moved to a position close to the upper corner of the front window 1, and the front window 1 is wiped.

Figure 13:
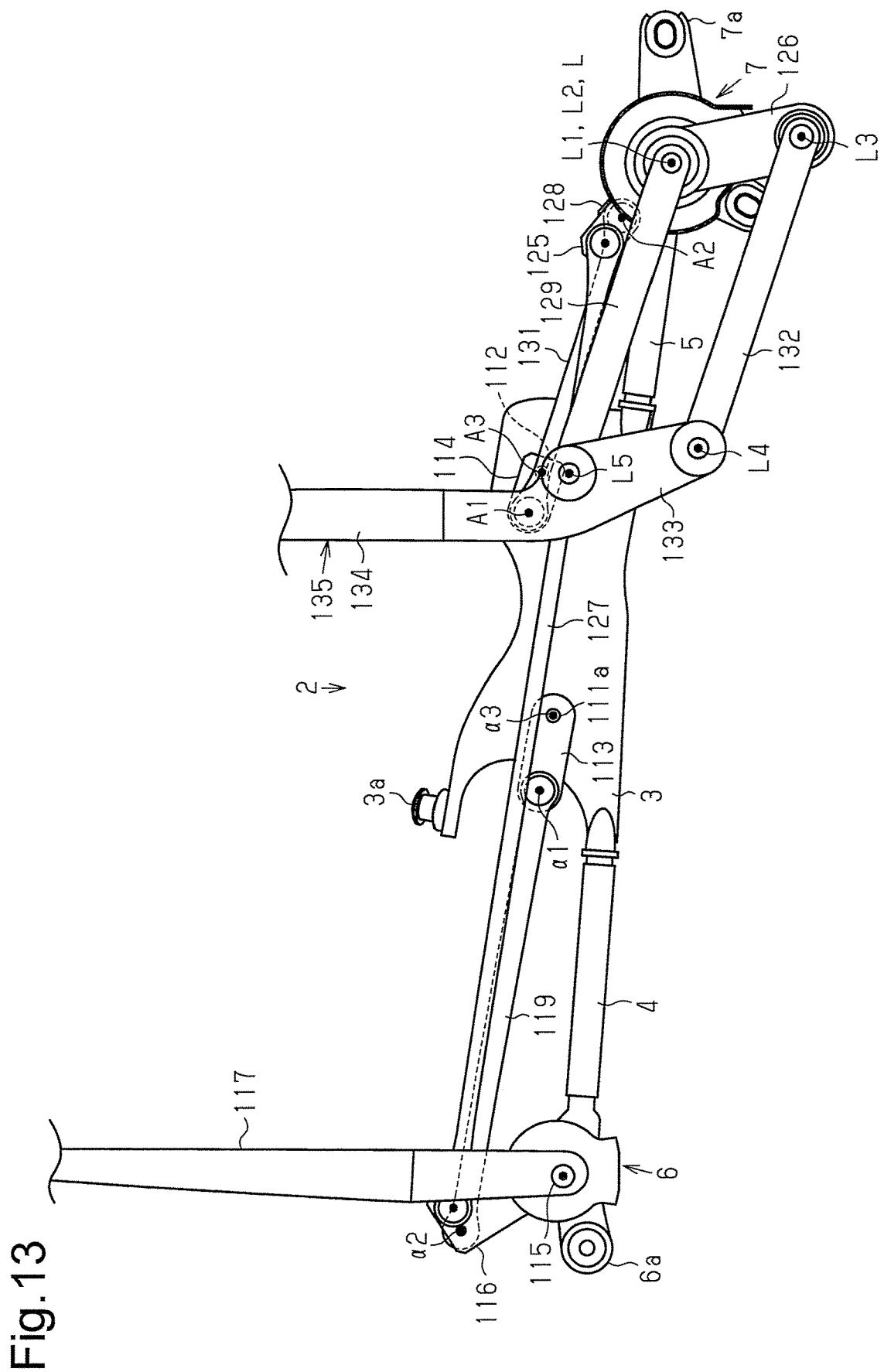
FIG. 13 is a plan view for illustrating an operation of the vehicle wiper device shown in FIG. 9.

As shown in FIG. 13, the swing crank arm 113 is further rotated by 90°, and the first driving lever 126 is further pivoted. This completes the forward movement of the first wiper arm 135 (and the first wiper blade 136). By this time, the extension-contraction crank arm 114 is further rotated by 180°, and the second driving lever 129 is pivoted (in the reverse direction) so that and the fifth axis L5 moves downward to the reference position (same position as the rest position). As a result, the enlarged range Z2 of the front window 1 is wiped by the forward movement of the first wiper blade 136 (refer to FIG. 9).

Figure 14:
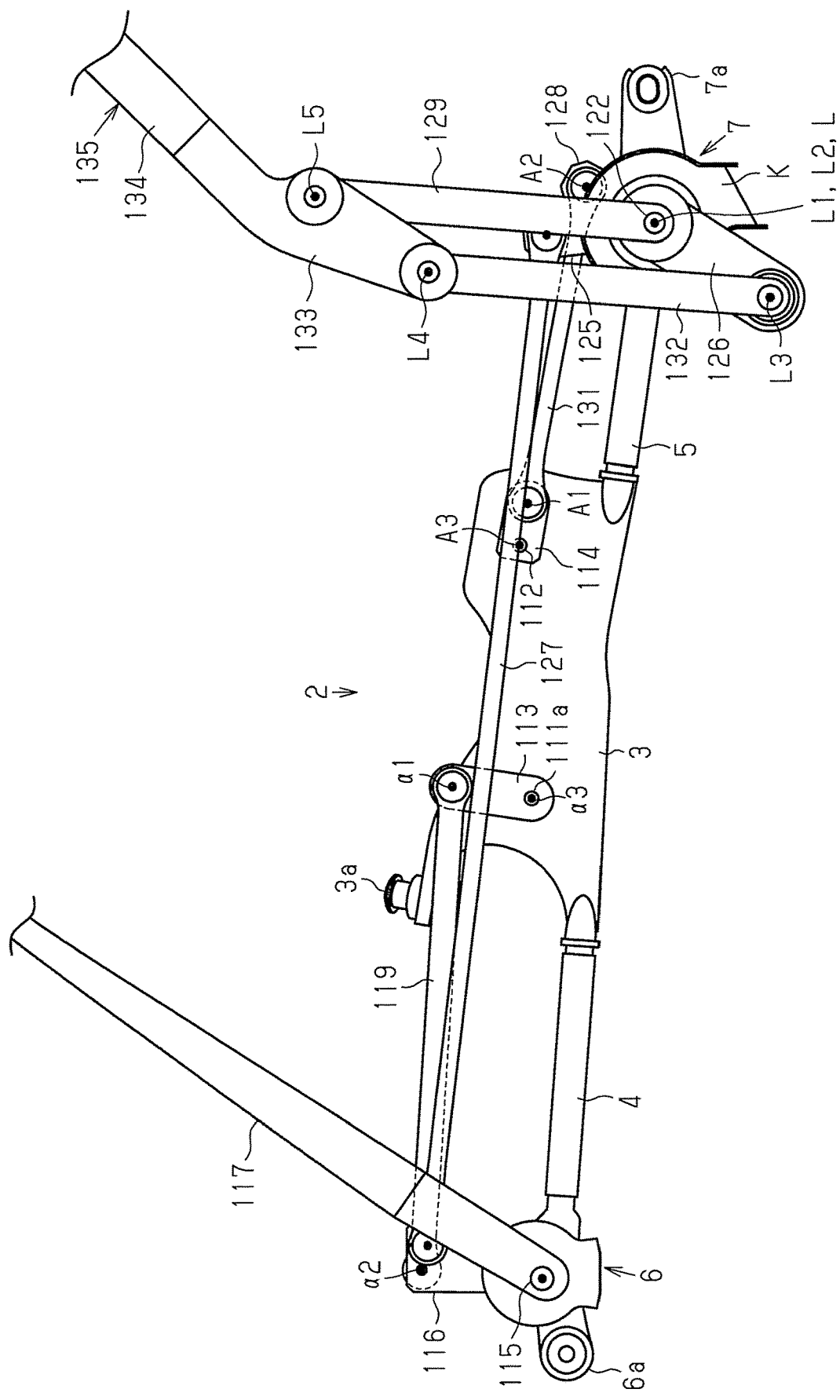
FIG. 14 is a plan view for illustrating an operation of the vehicle wiper device shown in FIG. 9.

As shown in FIG. 14, the swing crank arm 113 is further rotated by 90°, and the first driving lever 126 is pivoted in the reverse direction. This moves the first wiper arm 135 (and the first wiper blade 136) in the reverse direction approximately one-half of the distance between the upper and lower reversal positions. By this time, the extension-contraction crank arm 114 is rotated by 180°, and the second driving lever 129 is pivoted so that the fifth axis L5 moves upward.

As shown in FIG. 10, the swing crank arm 113 is further rotated by 90°, and the first driving lever 126 is further pivoted. This completes the backward movement of the first wiper arm 135 (and the first wiper blade 136). By this time, the extension-contraction crank arm 114 is further rotated by 180°, and the second driving lever 129 is pivoted so that the fifth axis L5 moves downward to the reference position (same position as the rest position). As a result, the enlarged range Z2 of the front window 1 is wiped by the backward movement of the first wiper blade 136 (refer to FIG. 9).

The advantageous effects of the second embodiment will now be described below.

(6) The vehicle wiper device includes the rotation speed conversion transmission member P connecting and driving the extension-contraction crank arm 114 and the swing crank arm 113 so that the extension-contraction crank arm 114 rotates at a rotation speed two times greater than the rotation speed of the swing crank arm 113. Thus, when the single motor 111 is driven, the swing crank arm 113 rotates, and the extension-contraction crank arm 114 rotates at a rotation speed two times greater than the rotation speed of the swing crank arm 113. The driving force is transmitted to the first driving lever 126 via the swing transmission mechanism, which includes the swing crank arm 113, and the second driving lever 129 via the extension-contraction transmission mechanism, which includes the extension-contraction crank arm 114. When the swing movement of the first wiper arm 135, that is, the wiping operation of the first wiper blade 136, is performed by the pivoting of the first driving lever 126, the fifth axis L5 (the proximal end of the first wiper arm 135), which is located at the distal end of the second driving lever 129, is moved by the pivoting of the second driving lever 129. The extension-contraction crank arm 114 rotates at a rotation speed two times greater than the rotation speed of the swing crank arm 113. Thus, when the first driving lever 126 (and eventually the first wiper blade 136) reciprocally swings once, the second driving lever 129 (and eventually the proximal end of the first wiper arm 135) reciprocally swings twice. When the first wiper blade 136 is located at the intermediate point of the upper and lower reversal positions, the fifth axis L5 is moved to the upper side of the front window 1. When the first wiper blade 136 is located at the upper and lower reversal positions, the fifth axis L5 is moved to the lower side of the front window 1. Thus, the portion close to the upper corner of the front window 1 is wiped, and the wiping range of the first wiper blade 136 is enlarged (to the enlarged range Z2).

(7) The swing transmission mechanism reciprocally swings the first driving lever 126 once when the swing crank arm 113 rotates once. The extension-contraction transmission mechanism reciprocally swings the second driving lever 129 once when the extension-contraction crank arm 114 rotates once. Thus, the wiping range of the first wiper blade 136 is enlarged by simply rotating the motor 111 in one direction. Thus, for example, the motor 111 is easily controlled as compared with a case in which the motor 111 rotates forward and reversely. Additionally, for example, in a configuration that pivots the swing crank arm 113 by less than one revolution to reciprocally swing the first driving lever 126 once, if the motor 111 (the rotation shaft 111a) pivots beyond a set range due to an abnormality, the first wiper blade 136 may deviate from the set wipe range (and, for example, interfere with the pillar). However, this can be avoided. Additionally, since the motor 111 is rotated in only one direction, the torque of the motor 111 is reduced, for example, as compared with a case in which the motor 111 rotates forward and reversely.

(8) The rotation speed conversion transmission member P includes the swing-side rotation body 113a rotated integrally with swing crank arm 113, the extension-contraction-side rotation body 114a rotated integrally with extension-contraction crank arm 114, and the intermediate transmission member (belt B) connecting and driving the swing-side rotation body 113a and the extension-contraction-side rotation body 114a. Thus, the space is saved, for example, as simply compared with a case in which two gears are used. More specifically, in order to arrange the swing crank arm 113 and the extension-contraction crank arm 114 on the same plane, the swing crank arm 113 and the extension-contraction crank arm 114 need to be separated from each other so as not to interfere with each other. With such a separation, when the rotation speed conversion transmission member P includes a large diameter gear rotated integrally with the swing crank arm 113 and a small diameter gear rotated integrally with the extension-contraction crank arm 114 and engaged with the large diameter gear, the large diameter gear is increased in size, needing a large installation space. However, this can be avoided.

(9) The intermediate transmission member is the belt B, which is a looped wire member running over the swing-side rotation body 113a and the extension-contraction-side rotation body 114a. Thus, for example, even when the swing-side rotation body 113a and the extension-contraction-side rotation body 114a are largely separated from each other, the swing-side rotation body 113a and the extension-contraction-side rotation body 114a are connected and driven by a single member in a space-saving manner.

(10) The rotation shaft 111a of the motor 111 is integrally rotatably connected to the swing crank arm 113. Thus, the rotation shaft 111a is rotated at a low speed, for example, as compared with a case in which the rotation shaft 111a of the motor 111 is integrally rotatably connected to the extension-contraction crank arm 114. This increases the durability of bearings of the rotation shaft 111a in the motor 111.

The second embodiment may be modified as follows.

In the second embodiment, the rotation shaft 111a of the motor 111 is integrally rotatably connected to the swing crank arm 113. There is no limit to such a configuration. The rotation shaft 111a of the motor 111 may be integrally rotatably connected to the extension-contraction crank arm 114.

Figure 16:
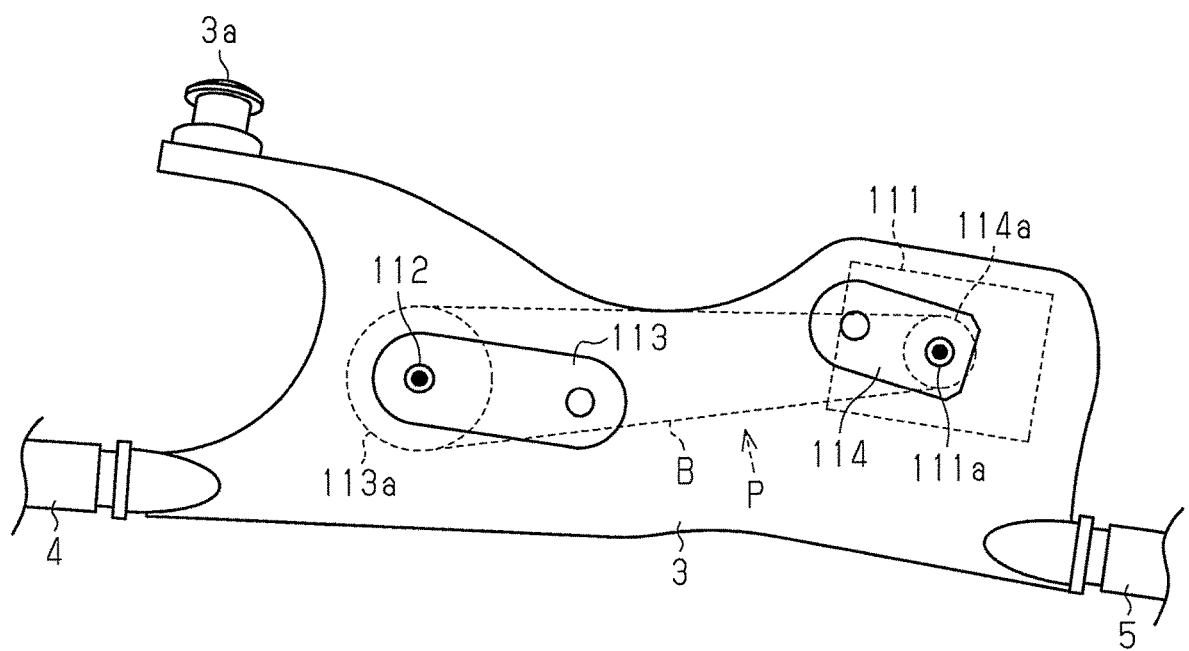
FIG. 16 is a partial enlarged plan view of a vehicle wiper device in a further example of the second embodiment.

As shown in FIG. 16, the rotation shaft 111a of the motor 111 extends through the central frame 3 and projects from the surface (the surface toward the outer side of the vehicle)

of the central frame 3 at a position of the central frame 3 toward the passenger seat side (the right side in FIG. 16). The proximal end of the extension-contraction crank arm 114 is fixed to the distal end of the rotation shaft 111a. In this case, the driven rotation shaft 112 is provided at a position of the central frame 3 toward the driver seat side (the left side in FIG. 16), and the proximal end of the swing crank arm 113 is fixed to the distal end of the driven rotation shaft 112. The extension-contraction-side rotation body 114a, which rotates integrally with the extension-contraction crank arm 114, is fixed to the proximal end of the rotation shaft 111a. The swing-side rotation body 113a, which rotates integrally with the swing crank arm 113, is fixed to the proximal end of the driven rotation shaft 112.

With this configuration, the same advantageous effects as the advantages (6) to (9) of the second embodiment are obtained. In this configuration, the torque of the motor 111 is reduced, for example, as compared with a case in which the rotation shaft 111a is integrally rotatably connected to the swing crank arm 113 (as in the second embodiment). This reduces, for example, heat generation. Additionally, for example, the motor 111 is reduced in size.

In the second embodiment, the swing transmission mechanism reciprocally swings the first driving lever 126 once when the swing crank arm 113 rotates once. The extension-contraction transmission mechanism reciprocally swings the second driving lever 129 once when the extension-contraction crank arm 114 rotates once. The motor 111 rotates only in one direction. However, there is no limit to such a configuration, and other configurations may be used. For example, the swing crank arm 113 may be configured to be pivoted by less than one rotation to reciprocally swing the first driving lever 126 once, and the motor 111 may be configured to rotate forward and reversely.

In the second embodiment, the rotation speed conversion transmission member P includes the swing-side rotation body 113a, the extension-contraction-side rotation body 114a, and the intermediate transmission member (belt B) connecting and driving them. Instead, as long as the extension-contraction crank arm 114 and the swing crank arm 113 are connected and driven so that the extension-contraction crank arm 114 rotates at a rotation speed two times greater than the rotation speed of the swing crank arm 113, the configuration may be changed to another configuration. For example, the rotation speed conversion transmission member may include a large diameter gear rotated integrally with the swing crank arm 113 and a small diameter gear rotated integrally with the extension-contraction crank arm 114 and engaged with the large diameter gear. Preferably, the number of teeth of the small diameter gear is one-half of the number of teeth of the large diameter gear. The intermediate transmission member (belt B) may be a gear that connects and drives the swing-side rotation body 113a and the extension-contraction-side rotation body 114a. The belt B may be formed of another looped wire member (e.g., a metal chain).

In the second embodiment, the first axis L1 of the first driving lever 126 and the second axis L2 of the second driving lever 129 are disposed on the same straight line L. However, there is no limit to such a configuration. For example, the first axis L1 of the first driving lever and the second axis L2 of the second driving lever may be located at positions separated from each other.

In the second embodiment, the first driving lever 126 is pivoted within a range below the first axis L1. The first driving lever 126 may be pivoted in a range above the first axis L1.

In the second embodiment, the length from the first axis L1 to the third axis L3 is set to be the same as the length from the fourth axis L4 to the fifth axis L5. The length from the third axis L3 to the fourth axis L4 is set to be the same as the length from the first axis L1 to the fifth axis L5. These lengths may be changed to differ from each other.

DESCRIPTION OF REFERENCE CHARACTERS 1) front window (wiped surface), 11) motor (drive source), 11a) rotation shaft, 12) swing crank arm configuring part of swing transmission mechanism, 13) extension-contraction crank arm configuring part of extension-contraction transmission mechanism, 16) driver seat side swing lever (second wiper arm lever) configuring part of swing transmission mechanism, 17) second wiper arm, 19) first connection rod configuring part of swing transmission mechanism and part of swing rod, 25) passenger seat side first swing lever configuring part of swing transmission mechanism, 26) first driving lever, 27) second connection rod configuring part of swing transmission mechanism and part of swing rod, 28) passenger seat side second swing lever configuring part of extension-contraction transmission mechanism, 29) second driving lever, 31) third connection rod (extension-contraction rod) configuring part of extension-contraction transmission mechanism, 32) first driven lever, 33) arm head (second driven lever), 35) first wiper arm, 36) first wiper blade, 51) connection rod (swing rod) configuring part of swing transmission mechanism, 52) connection rod (extension-contraction rod) configuring part of extension-contraction transmission mechanism, L1) first axis, L2) second axis, L3) third axis, L4) fourth axis, L5) fifth axis, θ1) first angular range, θ2) second angular range 111) motor (drive source), 113) swing crank arm configuring part of swing transmission mechanism, 113a) swing-side rotation body configuring part of rotation speed conversion transmission member, 114) extension-contraction crank arm configuring part of extension-contraction transmission mechanism, 114a) extension-contraction rotation body configuring part of rotation speed conversion transmission member, 116) driver seat side swing lever configuring part of swing transmission mechanism, 119) first connection rod configuring part of swing transmission mechanism, 125) passenger seat side first swing lever configuring part of swing transmission mechanism, 126) first driving lever, 127) second connection rod configuring part of swing transmission mechanism, 128) passenger seat side second swing lever configuring part of extension-contraction transmission mechanism, 129) second driving lever, 131) third connection rod configuring part of extension-contraction transmission mechanism, 132) first driven lever, 133) arm head (second driven lever), 135) first wiper arm, 136) first wiper blade, B) belt (intermediate transmission member and wire member) configuring part of rotation speed conversion transmission member, P) rotation speed conversion transmission member, L1) first axis, L2) second axis, L3) third axis, L4) fourth axis, L5) fifth axis

What is claimed is:

1. A vehicle wiper device, comprising:
a first driving lever having a distal end and a proximal end, the proximal end being pivotal about a first axis located at a fixed position in relation to a vehicle body;
a second driving lever having a distal end and a proximal end, the proximal end being pivotal about a second axis located at a fixed position in relation to the vehicle body;

a first driven lever having a distal end and a proximal end, the proximal end being pivotally connected to the distal end of the first driving lever about a third axis;

a second driven lever having a proximal end and a distal end, the proximal end being pivotally connected to the distal end of the first driven lever about a fourth axis, and the distal end being pivotally connected to the distal end of the second driving lever about a fifth axis;

a first wiper blade that reciprocally wipes a wiped surface between upper and lower reversal positions of the wiped surface;

a first wiper arm configured to operate integrally with the second driven lever and having a distal end to which the first wiper blade is connected;

a swing transmission mechanism configured to transmit a driving force to the first driving lever, the swing transmission mechanism including a swing crank arm integrally rotatable with a rotation shaft of a single drive source; and an extension-contraction transmission mechanism configured to transmit a driving force to the second driving lever, the extension-contraction transmission mechanism including an extension-contraction crank arm integrally rotatable with the rotation shaft of the drive source.

2. The vehicle wiper device according to claim 1, wherein
the swing crank arm pivots forward and reversely in a first angular range,
the swing crank arm, while within the first angular range, does not enter a first dead center state at which the rotation shaft cannot be rotated when an external force is applied to the first driving lever,
the extension-contraction crank arm pivots forward and reversely in a second angular range, and
an intermediate point of the second angular range corresponds to a second dead center state at which the rotation shaft cannot be rotated when an external force is applied to the second driving lever.

3. The vehicle wiper device according to claim 2, wherein
the swing transmission mechanism includes a swing rod directly connecting the swing crank arm and the first driving lever, and
the extension-contraction transmission mechanism includes an extension-contraction rod directly connecting the extension-contraction crank arm and the second driving lever.

4. The vehicle wiper device according to claim 3, further comprising:
a second wiper arm; and
a second wiper arm lever connected to the second wiper arm, wherein
the swing rod includes a first connection rod and a second connection rod,
the first connection rod connects the swing crank arm and the second wiper arm lever, and
the second connection rod connects the second wiper arm lever and the first driving lever.

5. The vehicle wiper device according to claim 1, further comprising a second wiper arm having a proximal end, wherein the proximal end of the second wiper arm is integrally rotatably connected to the rotation shaft of the drive source.

6. The vehicle wiper device according to claim 1, wherein at least part of the swing transmission mechanism moves inside a portion surrounded by the first driving lever, the second driving lever, the first driven lever, and the second driven lever as viewed in an axial direction of the first axis in at least part of a state in which the swing transmission mechanism is driven.

7. The vehicle wiper device according to claim 1, wherein at least part of the extension-contraction transmission mechanism moves inside a portion surrounded by the first driving lever, the second driving lever, the first driven lever, and the second driven lever as viewed in an axial direction of the first axis in at least part of a state in which the extension-contraction transmission mechanism is driven.

8. The vehicle wiper device according to claim 1, further comprising a second wiper arm having a proximal end, wherein
the first wiper arm has a proximal end,
the proximal end of the first wiper arm is disposed at a position toward a center in a vehicle width direction, and
the proximal end of the second wiper arm is disposed at a position toward a passenger seat side end in the vehicle width direction.

9. A vehicle wiper device, comprising:
a first driving lever having a distal end and a proximal end, the proximal end being pivotal about a first axis located at a fixed position in relation to a vehicle body;
a second driving lever having a distal end and a proximal end, the proximal end being pivotal about a second axis located at a fixed position in relation to the vehicle body;
a first driven lever having a distal end and a proximal end, the proximal end being pivotally connected to the distal end of the first driving lever about a third axis;
a second driven lever having a proximal end and a distal end, the proximal end being pivotally connected to the distal end of the first driven lever about a fourth axis, and the distal end being pivotally connected to the distal end of the second driving lever about a fifth axis;
a first wiper blade that reciprocally wipes a wiped surface between upper and lower reversal positions of the wiped surface;
a first wiper arm configured to operate integrally with the second driven lever and having a distal end to which the first wiper blade is connected;
a swing transmission mechanism configured to transmit a driving force to the first driving lever, the swing transmission mechanism including a swing crank arm rotated by a driving force of a single drive source;
an extension-contraction transmission mechanism configured to transmit a driving force to the second driving lever, the extension-contraction transmission mechanism including an extension-contraction crank arm; and
a rotation speed conversion transmission member connecting and driving the extension-contraction crank arm and the swing crank arm so that the extension-contraction crank arm rotates at a rotation speed two times greater than a rotation speed of the swing crank arm.

10. The vehicle wiper device according to claim 9, wherein
the swing transmission mechanism reciprocally swings the first driving lever once when the swing crank arm rotates once, and
the extension-contraction transmission mechanism reciprocally swings the second driving lever once when the extension-contraction crank arm rotates once.

11. The vehicle wiper device according to claim 9, wherein the rotation speed conversion transmission member includes
- a swing-side rotation body rotated integrally with the swing crank arm,
- an extension-contraction-side rotation body rotated integrally with the extension-contraction crank arm, and
- an intermediate transmission member connecting and driving the swing-side rotation body and the extension-contraction-side rotation body.

12. The vehicle wiper device according to claim 11, wherein the intermediate transmission member is a looped wire member running over the swing-side rotation body and the extension-contraction-side rotation body.

13. The vehicle wiper device according to claim 9, wherein a rotation shaft of the drive source is integrally rotatably connected to the swing crank arm.

14. The vehicle wiper device according to claim 9, wherein a rotation shaft of the drive source is integrally rotatably connected to the extension-contraction crank arm.

* * * * *